(12) United States Patent
Kutsumi et al.

(10) Patent No.: US 7,571,248 B2
(45) Date of Patent: Aug. 4, 2009

(54) OPERATION HISTORY UTILIZATION SYSTEM AND METHOD THEREOF

(75) Inventors: Hiroshi Kutsumi, Moriguchi (JP); Shouichi Araki, Osaka (JP); Atsushi Yoshida, Neyagawa (JP); Satoshi Matsuura, Kyotanabe (JP)

(73) Assignee: Panasonic Corporation, Osaka (JP)

( * ) Notice: Subject to any disclaimer, the term of this patent is extended or adjusted under 35 U.S.C. 154(b) by 442 days.

(21) Appl. No.: 10/535,394

(22) PCT Filed: Nov. 20, 2003

(86) PCT No.: PCT/JP03/14776

§ 371 (c)(1),
(2), (4) Date: May 18, 2005

(87) PCT Pub. No.: WO2004/049225

PCT Pub. Date: Jun. 10, 2004

(65) Prior Publication Data

US 2006/0053219 A1 Mar. 9, 2006

(30) Foreign Application Priority Data

Nov. 22, 2002 (JP) ............................. 2002-339702

(51) Int. Cl.
*G06F 15/173* (2006.01)
*G05B 11/01* (2006.01)
*G05B 15/00* (2006.01)

(52) U.S. Cl. ........................... 709/238; 700/17; 700/83
(58) Field of Classification Search ................. 700/17, 700/83; 709/238
See application file for complete search history.

(56) References Cited

U.S. PATENT DOCUMENTS

| 6,108,614 A * | 8/2000 | Lincoln et al. ............. 702/183 |
| 6,400,996 B1 * | 6/2002 | Hoffberg et al. ............. 700/83 |
| 6,850,252 B1 * | 2/2005 | Hoffberg ..................... 715/716 |
| 2002/0059584 A1 | 5/2002 | Ferman et al. |

(Continued)

FOREIGN PATENT DOCUMENTS

JP          7-160462          6/1995

(Continued)

OTHER PUBLICATIONS

Partial English translation of Figure 5 for JP 2002-7020.

(Continued)

*Primary Examiner*—Larry D Donaghue
*Assistant Examiner*—Karen C Tang
(74) *Attorney, Agent, or Firm*—Wenderoth, Lind & Ponack, L.L.P.

(57) ABSTRACT

An operation history utilization system including a terminal electric device, a server electric device (user server), and an application server that are connected to one another via network. On the terminal electric device, there is implemented a device agent for storing the device operated by a user, the operation details and the operation time as an operation history set. On the server electric device, there is implemented a user agent for receiving the operation history transmitted from the device agent at a predetermined timing and managing the history in a centralized manner. On the application server, there is implemented a service concierge for providing service, considering the user's taste by inquiring the user agent about the operation history.

17 Claims, 50 Drawing Sheets

U.S. PATENT DOCUMENTS

2003/0229471 A1* 12/2003 Guralnik et al. ............. 702/182
2004/0193294 A1* 9/2004 Shioya et al. ................. 700/83

FOREIGN PATENT DOCUMENTS

| JP | 7-234861 | 9/1995 |
|---|---|---|
| JP | 10-149246 | 6/1998 |
| JP | 2000-175136 | 6/2000 |
| JP | 2000-293540 | 10/2000 |
| JP | 2000-324246 | 11/2000 |
| JP | 2002-007020 | 1/2002 |
| JP | 2002-184157 | 6/2002 |
| JP | 2002-320246 | 10/2002 |
| JP | 2002-330416 | 11/2002 |
| JP | 2003-111157 | 4/2003 |
| WO | 02/41176 | 5/2002 |

OTHER PUBLICATIONS

Partial English translation of Figure 2 for JP 2000-324246.

* cited by examiner

FIG. 6

| Device type | Operation type | Operation type specific identifier |
|---|---|---|
| TV | Power On | PowerOn |
| | Power Off | PowerOn |
| | Volume Up | VolUp |
| | Volume Down | VolDown |
| | Change channels | Play |
| | ... | ... |
| VIDEO | Power On | PowerOn |
| | Power Off | PowerOff |
| | Play | Play |
| | Stop | Stop |
| | Record | Record |
| | Reserve | Reserve |
| | ... | ... |
| Air Conditioner | Power On | PowerOn |
| | Power Off | PowerOff |
| | Temperature setting | Set |
| | Air volume setting | Set |
| | Stop | Stop |
| | Reserve | Reserve |
| | ... | ... |
| ... | ... | ... |

FIG. 7

(Example 1)

| Operation date and time | Device type | Operation type specific identifier | Argument |
|---|---|---|---|
| 2002/08/29 11:00 | Air Conditioner | Set | 27 |

(Example 2)

| Operation date and time | Device type | Operation type specific identifier | Argument |
|---|---|---|---|
| 2002/08/30 18:00 | TV | Play | ID:XXXXXX |

FIG. 11

| Operation date and time | Device type | Operation type specific identifier | Argument |
|---|---|---|---|
| 2002/08/30 21:00 | TV | PowerOn | |
| 2002/08/30 21:00 | TV | Play | xxxxxxxxx04 |
| 2002/08/30 21:01 | AirConditioner | PowerOn | |
| 2002/08/30 21:46 | Video | Reserve | xxxxxxxxx09 |
| 2002/08/30 22:55 | TV | PowerOff | |
| 2002/08/30 22:57 | AirConditioner | PowerOff | |
| 2002/08/30 22:58 | MD | Play | xxxxxxxxxabc |
| ... | ... | ... | ... |
| 2002/08/31 20:56 | TV | PowerOn | |
| 2002/08/31 21:00 | TV | Play | xxxxxxxxx04 |
| 2002/08/31 21:00 | AirConditioner | PowerOn | |
| 2002/08/31 21:55 | TV | PowerOff | |
| 2002/08/31 21:56 | MD | Play | xxxxxxxxxabc |
| ... | ... | ... | ... |

| Episode | Operation sequence |
|---------|--------------------|
| 1001 | TV-PowerOn, TV-Play, AirConditioner-PowerOn |
| 1002 | Video-Reserve |
| 1003 | TV-PowerOff, AirConditioner-PowerOff, MD-Play |
| 1004 | TV-PowerOn, TV-Play, AirConditioner-PowerOn |
| 1005 | TV-PowerOff, MD-Play |

| No. | Frequent operation pattern |
|---|---|
| 1 | TV-PowerOn, TV-Play, AirConditioner-PowerOn |
| 2 | TV-PowerOff, MD-Play |

FIG. 18

| Device type | Operation type | Operation type specific identifier | Function identifier |
|---|---|---|---|
| TV | PowerOn | PowerOn | Watch |
| | PowerOff | PowerOff | Stop-Watch |
| | Change channels | Play | Watch |
| | ... | ... | ... |
| VIDEO | Play | Play | Watch |
| | Stop | Stop | Stop-Watch |
| | ... | ... | ... |
| Air Conditioner | PowerOn | PowerOn (25°C or higher) | Cool |
| | PowerOff | PowerOff (25°C or higher) | Stop-Cool |
| | Temperature setting | Set(25°C or higher) | Cool |
| | ... | ... | ... |
| Fan | PowerOn | PowerOn | Cool |
| | PowerOff | PowerOff | Stop-Cool |
| | ... | ... | ... |
| Radio | PowerOn | PowerOn | Listen |
| | PowerOff | PowerOff | Stop-Listen |
| | Select channel | Play | Listen |
| | ... | ... | ... |
| MD | Play | Play | Listen |
| | ... | ... | ... |
| ... | ... | ... | ... |

FIG. 20

| Operation date and time | Device type | Operation type specific identifier | Argument |
|---|---|---|---|
| 2002/08/30 21:00 | TV | PowerOn | |
| 2002/08/30 21:00 | TV | Play | xxxxxxxx04 |
| 2002/08/30 21:01 | AirConditioner | PowerOn | |
| 2002/08/30 22:55 | TV | PowerOff | |
| 2002/08/30 22:57 | AirConditioner | PowerOff | |
| 2002/08/30 22:58 | MD | Play | xxxxxxxxabc |
| ... | ... | ... | ... |
| 2002/08/31 20:56 | TV | PowerOn | |
| 2002/08/31 21:00 | Video | Play | xxxxxxxx04 |
| 2002/08/31 21:00 | Fan | PowerOn | |
| 2002/08/31 21:55 | TV | PowerOff | |
| 2002/08/31 21:56 | MD | Play | xxxxxxxxabc |
| ... | ... | ... | ... |

| Episode | Operation sequence | Function sequence |
|---|---|---|
| 2001 | TV-PowerOn, TV-Play, AirConditioner-PowerOn | Watch, Watch, Cool |
| 2002 | TV-PowerOff, AirConditioner-PowerOff, MD-Play | Stop-Watch, Stop-Cool, Listen |
| 2003 | TV-PowerOn, Video-Play, Fan-PowerOn | Watch, Watch, Cool |
| 2004 | TV-PowerOff, MD-Play | Stop-Watch, Listen |

FIG. 22

| No. | Frequent operation pattern |
|---|---|
| 1 | TV-PowerOff, MD-Play |

FIG. 23

| No. | Frequent function pattern |
|---|---|
| 1 | Watch, Watch, Cool |
| 2 | Stop-Watch, Listen |

FIG. 35

| Operation date and time | Device type | Operation type specific identifier | Argument |
|---|---|---|---|
| 2002/08/30 21:00 | TV | Play | xxxxxxxx04 |
| 2002/08/30 21:01 | AirConditioner | PowerOn | |
| 2002/08/30 21:01 | Light | PowerOn | |
| ... | ... | ... | ... |
| 2002/08/31 21:58 | AirConditioner | PowerOn | |
| 2002/08/31 21:58 | Light | PowerOff | |
| 2002/08/31 22:00 | TV | Play | xxxxxxxx05 |
| 2002/09/02 19:55 | TV | Play | xxxxxxxxcn |
| 2002/09/02 19:55 | Light | PowerOn | |
| 2002/09/02 19:58 | AirConditioner | PowerOn | |
| ... | ... | ... | ... |
| 2002/09/05 20:30 | AirConditioner | PowerOn | |
| 2002/09/05 20:31 | TV | Play | xxxxxxxxb6 |
| 2002/09/05 20:33 | Light | PowerOff | |
| ... | ... | ... | ... |

Rows grouped as: 3001, 3002, 3003, 3004

FIG. 36

| Internal ID | Content type | Global ID | Title | Genre | Artist/Performer |
|---|---|---|---|---|---|
| xxxxxxxx04 | TV | 2002/08/30 21:00 BS101 | Season of sun | Drama | Tatsuo Hujihara |
| xxxxxxxx05 | TV | 2002/08/31 22:00 BS113 | Romance 2000 | Movie | Bill Jobs |
| xxxxxxxxcn | TV | 2002/09/02 19:55 BS192 | News 20 | News | Hiroshi kume |
| xxxxxxxxb6 | TV | 2002/09/05 20:31 BS163 | Happy day | Movie | Steve Gates |
| ... | ... | ... | ... | ... | ... |

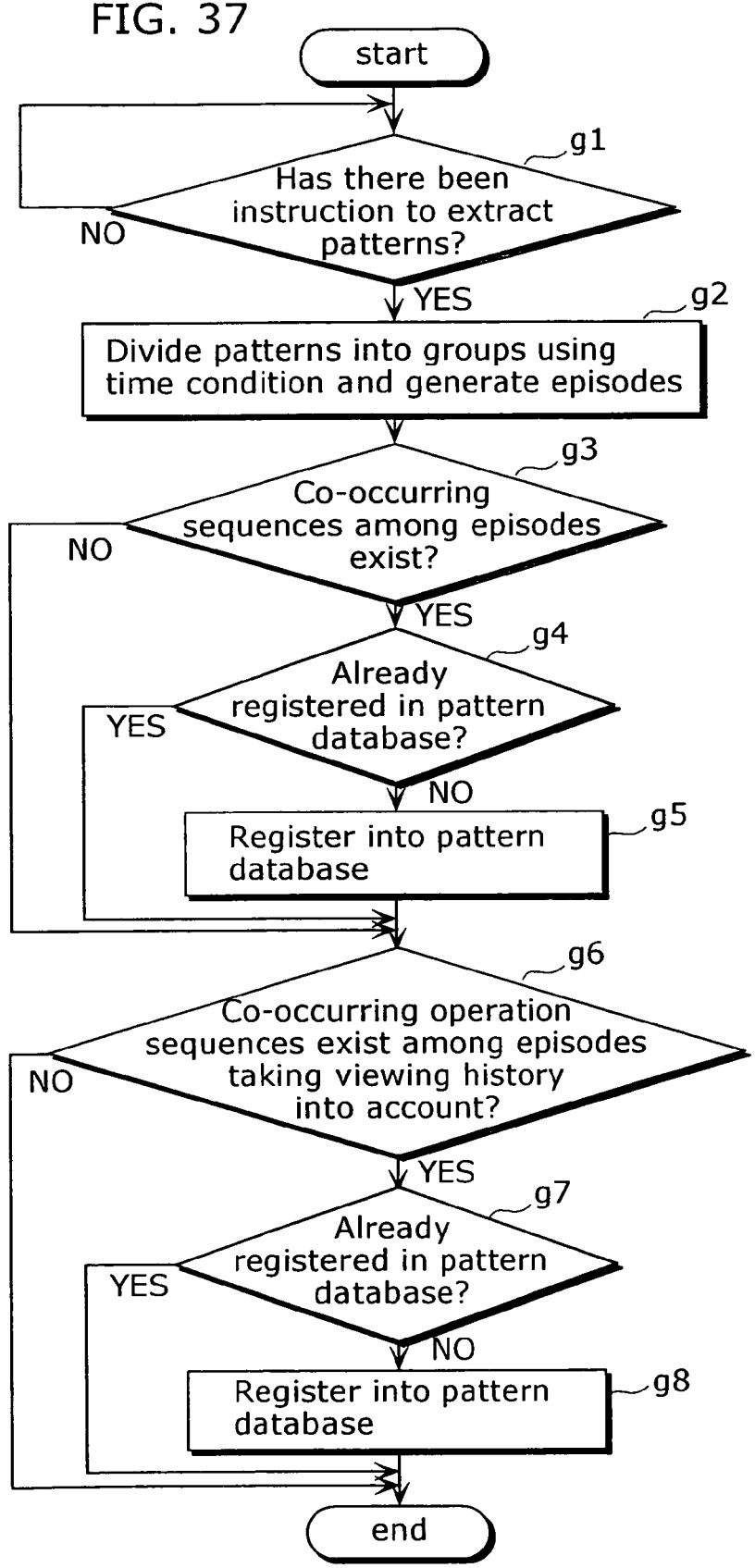

FIG. 38

| Episode | Operation sequence |
|---|---|
| 3001 | TV-Play, AirConditioner-PowerOn, Light-PowerOn |
| 3002 | AirConditioner-PowerOn, Light-PowerOff, TV-Play |
| 3003 | TV-Play, Light-PowerOn, AirConditioner-PowerOn |
| 3004 | AirConditioner-PowerOn, TV-Play, Light-PowerOff |

FIG. 39

| No. | Frequent operation pattern |
|---|---|
| 1 | TV-Play, AirConditioner-PowerOn, Light-PowerOn |
| 2 | TV-Play, AirConditioner-PowerOn, Light-PowerOff |
| 3 | TV-Play, AirConditioner-PowerOn |

FIG. 40

| Episode | Operation sequence |
|---|---|
| 3001 | TV-Drama, AirConditioner-PowerOn, Light-PowerOn |
| 3002 | AirConditioner-PowerOn, Light-PowerOff, TV-Movie |
| 3003 | TV-News, Light-PowerOn, AirConditioner-PowerOn |
| 3004 | AirConditioner-PowerOn, TV-Movie, Light-PowerOff |

FIG. 41

| No. | Frequent operation pattern |
|---|---|
| 1 | AirConditioner-PowerOn, Light-PowerOn |
| 2 | TV-Movie, AirConditioner-PowerOn, Light-PowerOff |

FIG. 43

| Operation date and time | User ID | Device type | Operation type specific identifier | Argument |
|---|---|---|---|---|
| 2002/08/29 11:00 | abc123xxxxx | Air Conditioner | Set | 27 |

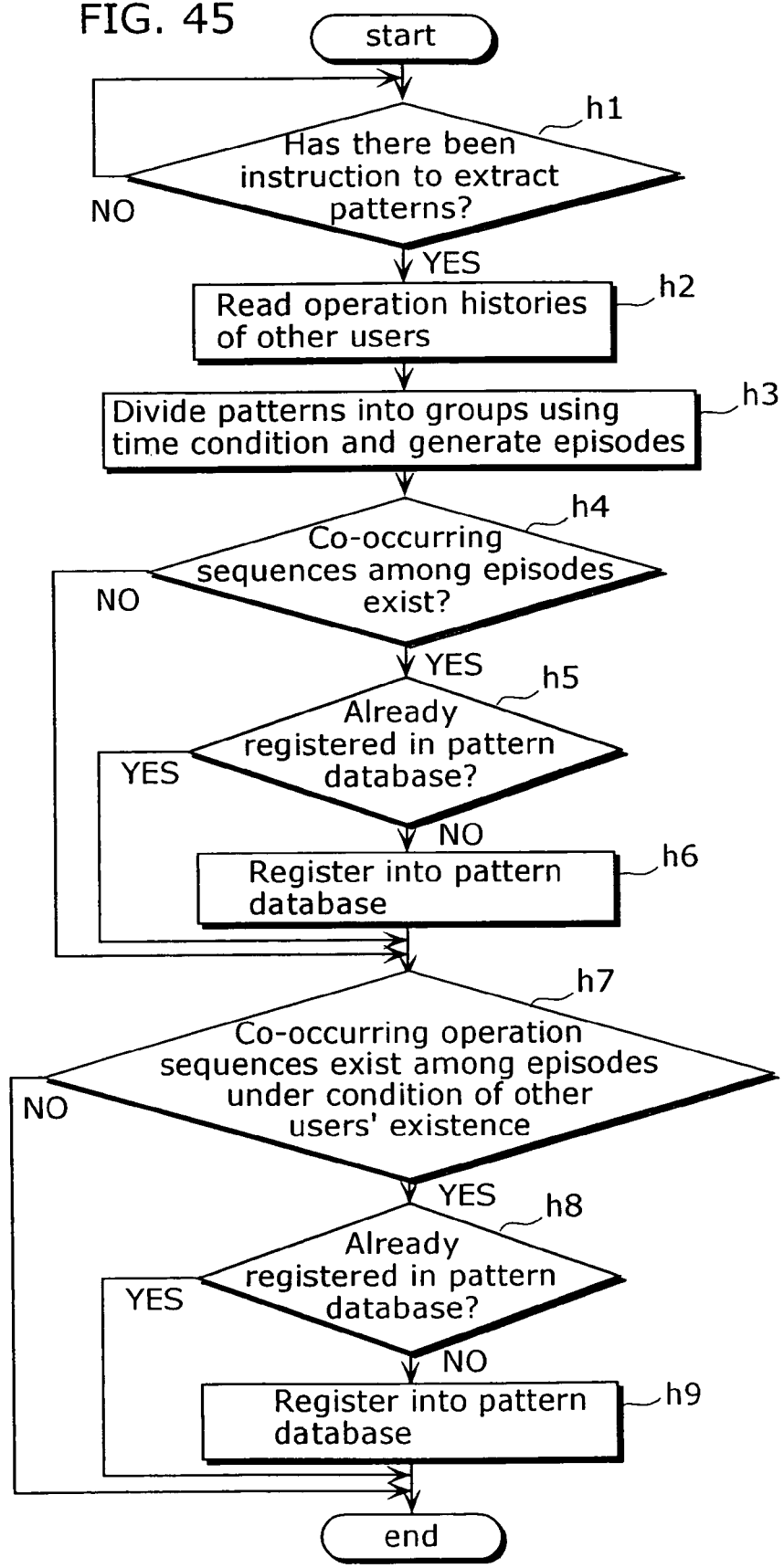

FIG. 46

| Operation date and time | User ID | Device type | Operation type specific identifier | Argument |
|---|---|---|---|---|
| 2002/08/30 21:00 | abc123xxx | TV | PowerOn | |
| 2002/08/30 21:00 | abc123xxx | TV | Play | xxxxxxxxxx04 |
| 2002/08/30 21:01 | abc123xxx | AirConditioner | PowerOn | |
| 2002/08/30 21:03 | def457yyy | Radio | PowerOff | |
| 2002/08/30 21:03 | abc123xxx | Light | PowerOn | |
| ... | ... | ... | ... | ... |
| 2002/08/31 20:56 | abc123xxx | TV | PowerOn | |
| 2002/08/31 21:00 | abc123xxx | AirConditioner | PowerOn | |
| ... | ... | ... | ... | ... |
| 2002/09/01 19:00 | abc123xxx | TV | PowerOn | |
| 2002/09/01 19:00 | abc123xxx | Light | PowerOn | |
| 2002/09/01 19:01 | abc123xxx | AirConditioner | PowerOn | |
| 2002/09/01 19:01 | def457yyy | MD | Stop | |
| ... | ... | ... | ... | ... |
| 2002/09/03 21:58 | abc123xxx | AirConditioner | PowerOn | |
| 2002/09/03 22:00 | abc123xxx | TV | PowerOn | |
| 2002/09/03 22:00 | abc123xxx | TV | Play | xxxxxxxxxabc |
| ... | ... | ... | ... | ... |

| Episode | Operation sequence | Other users who existed |
|---|---|---|
| 4001 | TV-PowerOn, TV-Play, AirConditioner-PowerOn, Light-PowerOn | def457yyy |
| 4002 | TV-PowerOn, AirConditioner-PowerOn | |
| 4003 | TV-PowerOn, Light-PowerOn, AirConditioner-PowerOn | def457yyy |
| 4004 | AirConditioner-PowerOn, TV-PowerOn, TV-Play | |

FIG. 48

| No. | Frequent operation pattern |
|---|---|
| 1 | TV-PowerOn, AirConditioner-PowerOn, Light-PowerOn |
| 2 | TV-PowerOn, AirConditioner-PowerOn |

FIG. 49

| No. | Frequent operation pattern | Other users who existed |
|---|---|---|
| 1 | TV-PowerOn, AirConditioner-PowerOn, Light-PowerOn | def457yyy |
| 2 | TV-PowerOn, AirConditioner-PowerOn | |

FIG. 51

| Operation date and time | Device type | Operation type specific identifier | Argument |
|---|---|---|---|
| 2002/09/28 13:32 | Tel | Call | 06-1111-2222 |
| 2002/09/28 13:35 | CD | Play | ID:abc123456 |
| ... | ... | ... | ... |
| 2002/09/29 18:11 | Tel | Call | 03-1234-5678 |
| 2002/09/29 18:15 | OvenRange | PowerOn | ... |
| 2002/09/30 16:21 | Tel | Call | 03-1234-5678 |
| 2002/09/30 16:25 | OvenRange | PowerOn | ... |
| 2002/10/01 11:41 | Tel | Call | 06-1111-2222 |
| 2002/10/01 11:43 | CD | Play | ID:def98765 |
| ... | ... | ... | ... |

| Episode | Operation sequence |
|---|---|
| | Tel-Call, CD-Play |
| | Tel-Call, OvenRange-PowerOn |
| | Tel-Call, OvenRange-PowerOn |
| | Tel-Call, CD-Play |

FIG. 53

| No. | Frequent operation pattern |
|---|---|
| 1 | Tel-Call ,CD-Play |
| 2 | Tel-Call, OvenRange-PowerOn |

FIG. 54

| Episode | Operation sequence |
|---|---|
| 5001 | Tel-Call-0611112222, CD-Play |
| 5002 | Tel-Call-0312345678, OvenRange-PowerOn |
| 5003 | Tel-Call-0312345678, OvenRange-PowerOn |
| 5004 | Tel-Call-0611112222, CD-Play |

FIG. 55

| No. | Frequent operation pattern |
|---|---|
| 1 | Tel-Call-0611112222, CD-Play |
| 2 | Tel-Call-0312345678, OvenRange-PowerOn |

… continued …

OPERATION HISTORY UTILIZATION SYSTEM AND METHOD THEREOF

TECHNICAL FIELD

The present invention relates to a system for providing a user with service such as automatic control of a device and providing information by effectively using an operation history of the device.

BACKGROUND ART

As a technique for predicting a user's behavior, in particular, there has been suggested a conventional method for using a movement history so as to utilize the movement history for marketing and recommending information. For example, Japanese Laid-Open Patent applications No. 2000-293540 and No. 2000-324246 disclose a method for (i) storing a user's movement history using an information terminal provided with a function of a Personal Handyphone System (PHS) or a cellular phone, (ii) predicting the user's behavior based on the movement history and (iii) transmitting information associated with the predicted behavior via a PHS network or a cellular phone network to the information terminal.

However, such conventional method as described above is a technique for providing service according to only position information of a single device, for example, by collecting a movement history of a cellular phone between base stations. In the future, networking of devices is expected to develop even more. Thus, there is need for integrating information of various operation histories collected from a plurality of devices owned by a user, and using such integrated information to provide service, via network, such as a marketing research like analyzing the user's taste and recommending content.

SUMMARY OF THE INVENTION

The first object of the present invention is to effectively utilize operation history on a device, and to provide a user with an appropriate service such as automatic control of the device or providing information.

The second object of the present invention is to effectively utilize operation histories of not only a single device but also a plurality of devices, and to provide the user with an appropriate service such as automatic control of the devices or providing information.

In order to achieve the above mentioned first object, an operation history utilization system according to the present invention utilizes a user's operation history on a device, and provides the user with service, the system including: a device which has a function of transmitting operation data that describes the user's operation details; and a service provision apparatus which accumulates the operation data transmitted from the device as operation history data in chronological order, and provides service according to the user's behavior predicted from a frequent operation pattern included in the accumulated operation history data.

Here, said service provision apparatus may include: a user server apparatus which accumulates the operation history data, and predicts the user's behavior from the frequent operation pattern included in the accumulated operation history data; and an application server apparatus which provides service according to the user's behavior predicted by said user server apparatus. Also, said service provision apparatus may include: a user server apparatus which accumulates the operation history data; and an application server apparatus which predicts the user's behavior from the frequent operation pattern included in the operation history data accumulated in said user server apparatus, and provides service according to the predicted user's behavior.

Thereby, the service is provided, predicted from the frequent operation pattern of the operation data transmitted from the device. Thus, the operation history utilization system is realized, the system effectively utilizing the operation history on the device.

Also, in order to achieve the second object, the operation history utilization system according to the present invention includes a plurality of devices which transmit respective operation data that describes the user's operation details, wherein the service provision apparatus accumulates the operation data transmitted from the plurality of devices as operation history data in chronological order, and provides service according to the user's behavior predicted from a frequent operation pattern included in the accumulated operation history data.

Thereby, the user's behavior is predicted from not only the operation history of a single device but also from operation histories of the plurality of devices, and the service is provided. Thus, a more beneficial and appropriate service for the user can be provided.

The present invention can be realized not only as the above mentioned operation history utilization system, but also as follows: an operation history utilization method including the characteristic components of the system as steps; a single device or a single service provision apparatus included in the operation history utilization system; a program executed by a personal computer and the like; and a computer-readable storage medium in which the program is stored, such as CD-ROM.

The disclosure of Japanese Patent Application No. 2002-339702 filed on Nov. 22, 2002 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 6 is a diagram showing an example of operations which should be stored as histories in the device agent as shown in FIG. 4;

FIG. 7 is a diagram showing examples of operation history data stored in an operation history storage unit as shown in FIG. 4;

FIG. 11 is a diagram showing an example of operation history data registered in the operation history database as shown in FIG. 9;

FIG. 13 is a diagram showing a result of classifying the operation history data as shown in FIG. 11 into a series of episodes;

FIG. 18 is a diagram showing an example of registered details in the function and action database as shown in FIG. 17;

FIG. 20 is a diagram showing an example of operation history data registered in the operation history database as shown in FIG. 17;

FIG. 21 is a diagram showing a result of classifying the operation history data as shown in FIG. 20 into a series of episodes;

FIG. 22 is a diagram showing a frequent operation pattern obtained from the episodes as shown in FIG. 21;

FIG. 23 is a diagram showing frequent function patterns obtained from the episodes as shown in FIG. 21;

FIG. 35 is a diagram showing an example of operation history data registered in the operation history database as shown in FIG. 34;

FIG. 36 is a diagram showing an example of viewing history data registered in the viewing history database as shown in FIG. 34;

FIG. 37 is a flow chart showing a processing of extracting operation sequence patterns performed by the user agent as shown in FIG. 34;

FIG. 38 is a diagram showing a result of classifying the operation history data as shown in FIG. 35 into a series of episodes;

FIG. 39 is a diagram showing frequent operation patterns obtained from the episodes as shown in FIG. 38;

FIG. 40 is a diagram showing a converted result of the episodes as shown in FIG. 38;

FIG. 41 is a diagram showing frequent operation patterns obtained from the episodes as shown in FIG. 40;

FIG. 43 is a diagram showing operation history data stored in the operation history storage unit as shown in FIG. 42;

FIG. 45 is a flow chart showing a processing of extracting operation sequence patterns as shown in FIG. 44;

FIG. 46 is a diagram showing a merged result of operation history data collected from a plurality of users in the user agent as shown in FIG. 44;

FIG. 47 is a diagram showing a result of classifying the operation history data as shown in FIG. 46 into a series of episodes;

FIG. 48 is a diagram showing frequent operation patterns obtained from the episodes as shown in FIG. 47;

FIG. 49 is a diagram showing frequent operation patterns to which attendant information is attached, the attendant information being obtained from the episodes as shown in FIG. 47;

FIG. 51 is a diagram showing an example of operation history data according to the fifth embodiment of the present invention;

FIG. 52 is a diagram showing a result of classifying the operation history data as shown in FIG. 51 into a series of episodes;

FIG. 53 is a diagram showing frequent operation patterns obtained from the episodes as shown in FIG. 52;

FIG. 54 is a diagram showing episodes to which telephone numbers of other parties are attached, obtained from the operation history data as shown in FIG. 51;

FIG. 55 is a diagram showing frequent operation patterns obtained from the episodes as shown in FIG. 54;

DETAILED DESCRIPTION OF THE INVENTION

Figure 1:
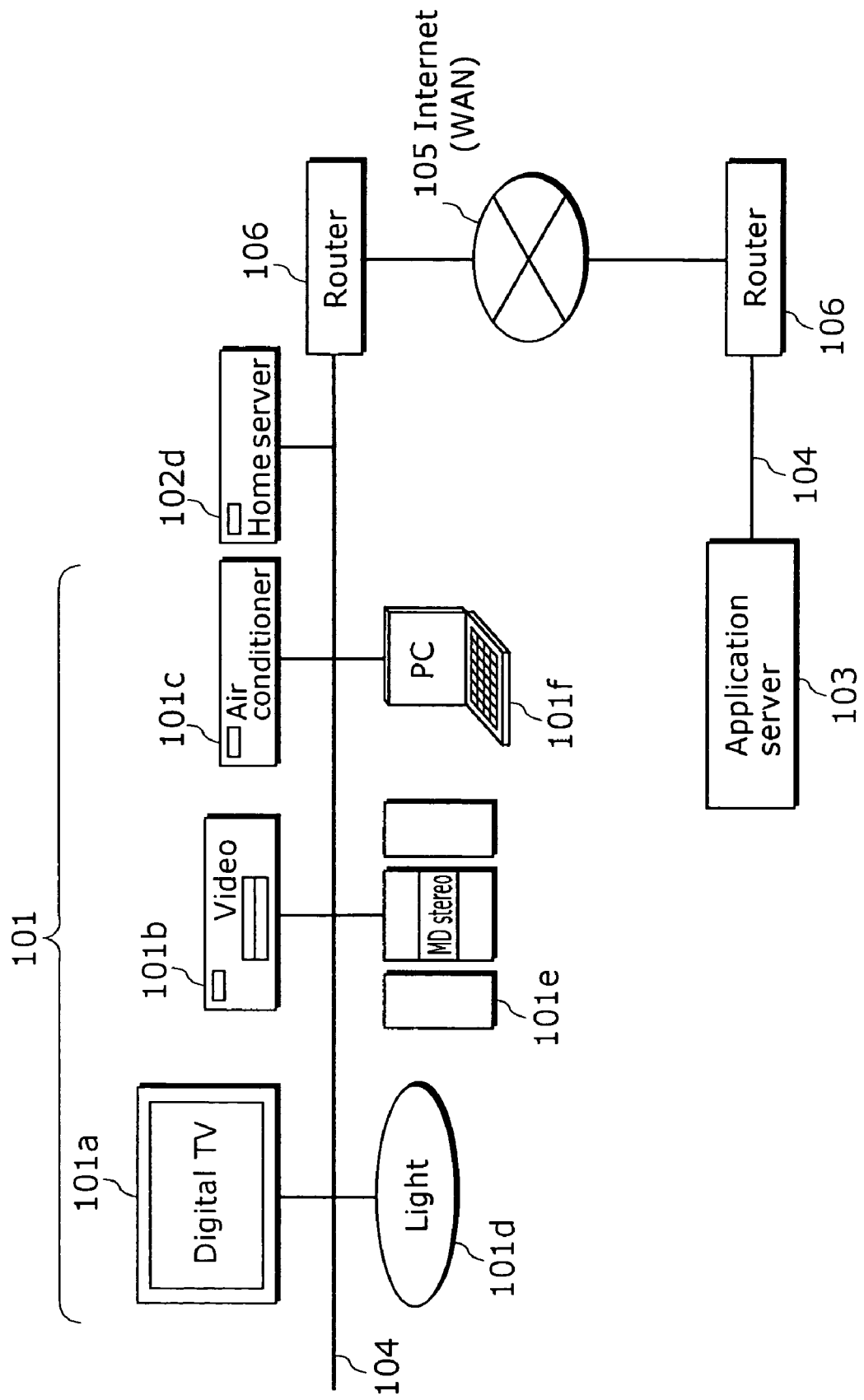
FIG. 1 is a schematic diagram showing an overall configuration example of an operation history utilization system according to the present invention.

Hereinafter, embodiments of the present invention will be described in detail referring to the drawings.

First Embodiment

FIG. 1 is a block diagram showing an overall configuration of an operation history utilization system according to the first embodiment. The operation history utilization system includes: terminal electric devices 101 such as a digital TV (hereinafter, referred to simply as television or TV) 101a, a video 101b, an air conditioner 10c, a light 101d, a Mini Disc (MD) stereo 101e and a Personal Computer (PC) 101f; a server electric device (user server) 102 such as a home server and a home gateway; an application server 103 which is allowed to access the server electric device 102; a Local Area Network (LAN) 104 made up of a cable or a wireless network; a Wide Area Network (WAN) 105 such as Internet; and a router 106 for connecting the LAN 104 to the WAN 105.

The server electric device 102 is always turned on, and allows access from the side of the WAN 105 according to a predetermined condition. FIG. 1 shows one of a plurality of application servers 103 which provide service such as automatically controlling devices and providing information. The router 106 has a modem function which deals with Asymmetric Digital Subscriber Line (ADSL) and Fiber To The Home (FTTH) used to access the WAN 105, according to need.

Figure 2:
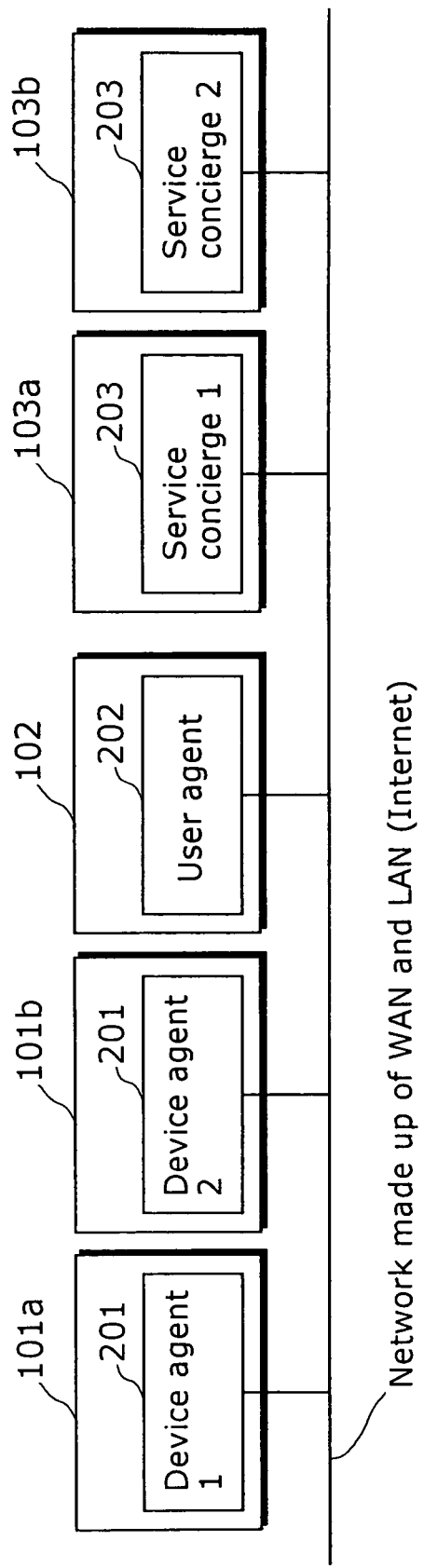
FIG. 2 is a diagram showing arrangement of main functional modules included in the system as shown in FIG. 1.

FIG. 2 shows main functional modules (programs) respectively implemented in (i) terminal electric devices 101a and 101b (here, only the TV 101a and the video 101b are shown, but other terminal electric devices 10c, 101d, 101e and 101f have the same functional configurations, thus these are not shown in the drawing), (ii) a server electric device 102 and (iii) application servers 103a and 103b (here, an example is shown provided that two of the application servers 103 as shown in FIG. 1 are connected). A device agent 201 is implemented in each of the terminal electric devices 101a and 101b, the device agent 201 storing device operation history using a user's operation as a trigger. A user agent 202 is implemented in the server electric device 102, the user agent 202 receiving the device operation history transmitted at a predetermined timing from the device agent 201 and managing the received device operation histories in a centralized manner. And, a service concierge 203 is implemented in each of the application servers 103a and 103b, the service concierge 203 providing service using the device operation history provided by the user agent 202.

Figure 3:
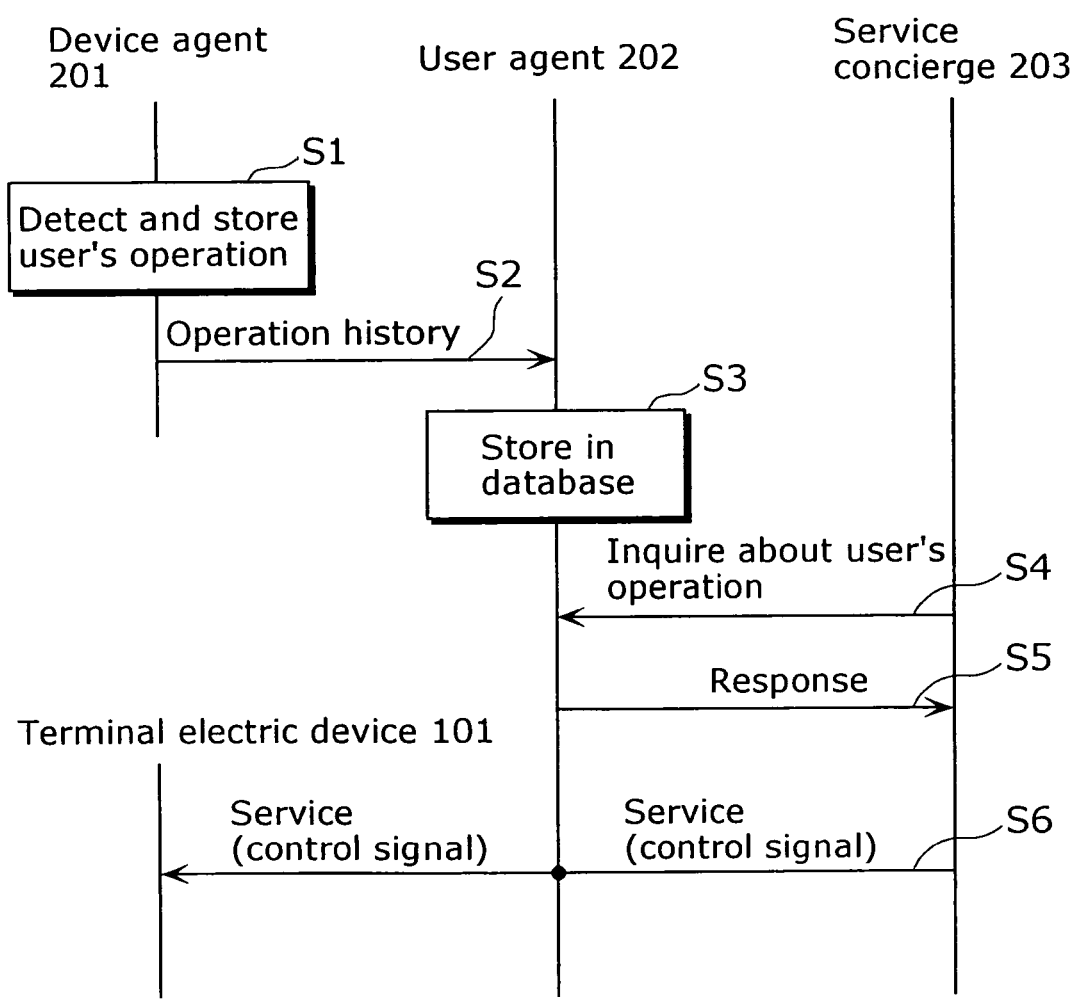
FIG. 3 is a communication sequence diagram for describing respective main functions and roles of a device agent, a user agent and a service concierge.

FIG. 3 is a communication sequence diagram for describing respective main functions and roles of the device agent 201, the user agent 202 and the service concierge 203. As shown in FIG. 3, after detecting the user's operation on the terminal electric device 101 and temporarily storing the detected user's operation (S1), the device agent 201 transmits the stored operation as the operation history to the user agent 202 (S2). The user agent 202 accumulates and manages the operation histories transmitted from the device agent 201 as a database (S3), and in response to the inquiry about the database from the service concierge 203 (S4), transmits a response (S5). After obtaining information required for providing service by issuing an inquiry to the user agent 202 when receiving a request to provide service from the terminal electric device 101 and the like, the service concierge 203 provides service according to request (S6) by transmitting a control signal to the terminal electric device 101 via the user agent 202 (or without involving the user agent 202) and performing automatic remote control and the like. Here, the provided services are as follows: predicting and supporting the user's device operation by performing automatic remote control on the terminal electric device 101; and providing information which is beneficial to the user via the video and audio output unit of the terminal electric device 101 by transmitting information to the terminal electric device 101.

In the case where the server electric device 102 is a home server including a recording function, in addition to the user agent 202, its own device agent 201 may be implemented in the server electric device 102. Also, in the case where there are a plurality of electric devices which are candidates to be the server electric device 102, one device is selected using a predetermined method.

Figure 4:
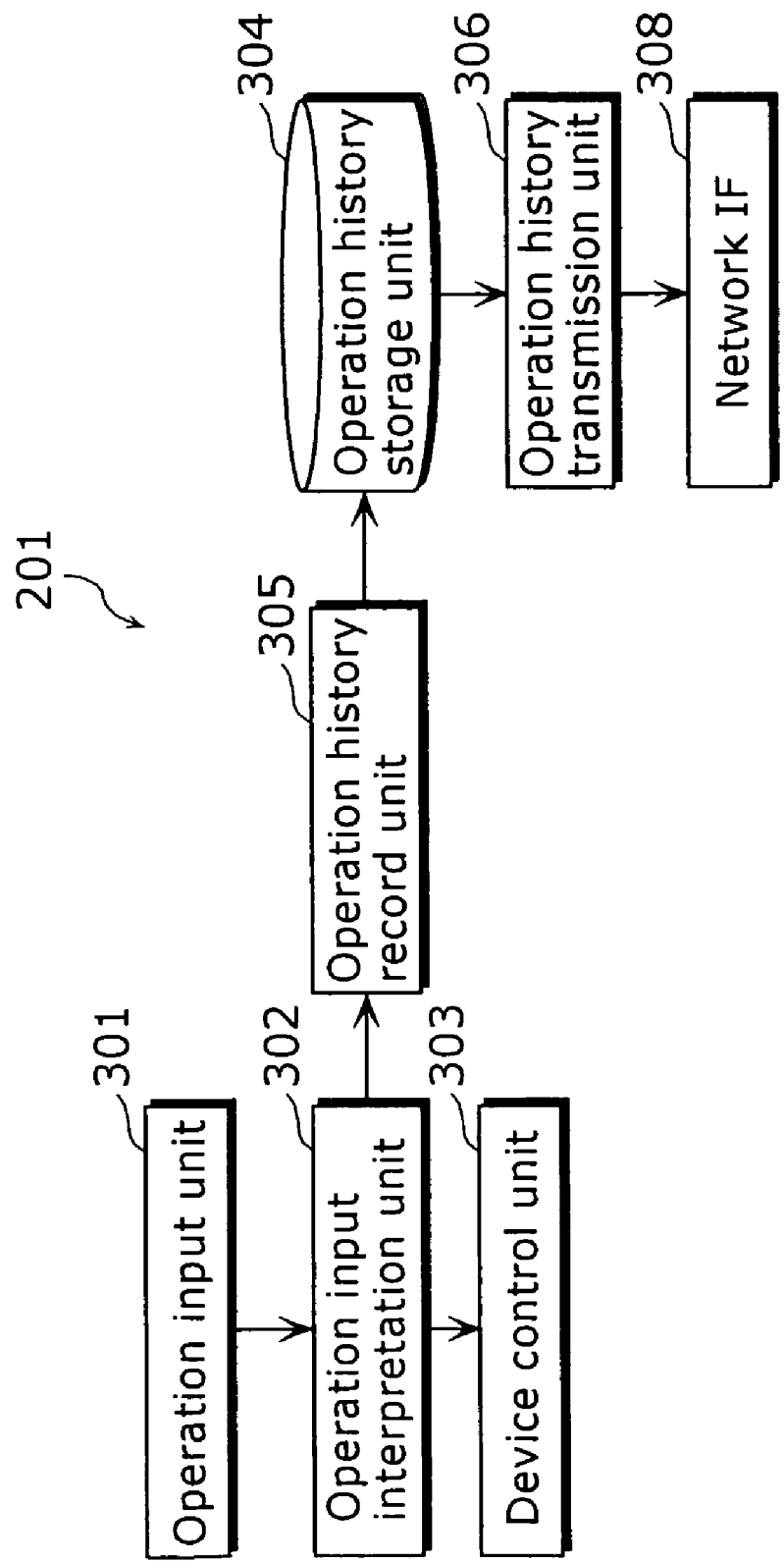
FIG. 4 is a block diagram showing a configuration of a device agent according to the first embodiment of the present invention.

First, a configuration and operation of the device agent 201 will be described. FIG. 4 is a block diagram showing a configuration of the device agent 201. The device agent 201 includes: an operation input unit 301 which receives a user's operation inputted via a remote control and the like; an operation input interpretation unit 302 which interprets operation input inputted from the operation input unit 301 and determines an operation state of the device; a device control unit 303 which controls the device according to the analysis result of the operation input interpretation unit 302; an operation history storage unit 304 which pairs the operation date and time with the operation details and stores the paired data regarding the device operation; an operation history record unit 305 which additionally records, into the operation history storage unit 304, the device operation interpreted by the operation input interpretation unit 302; and an operation history transmission unit 306 which transmits, to the user agent 202, operation histories accumulated in the operation history storage unit 304 at a predetermined timing via a network interface (IF) 308.

Figure 5:
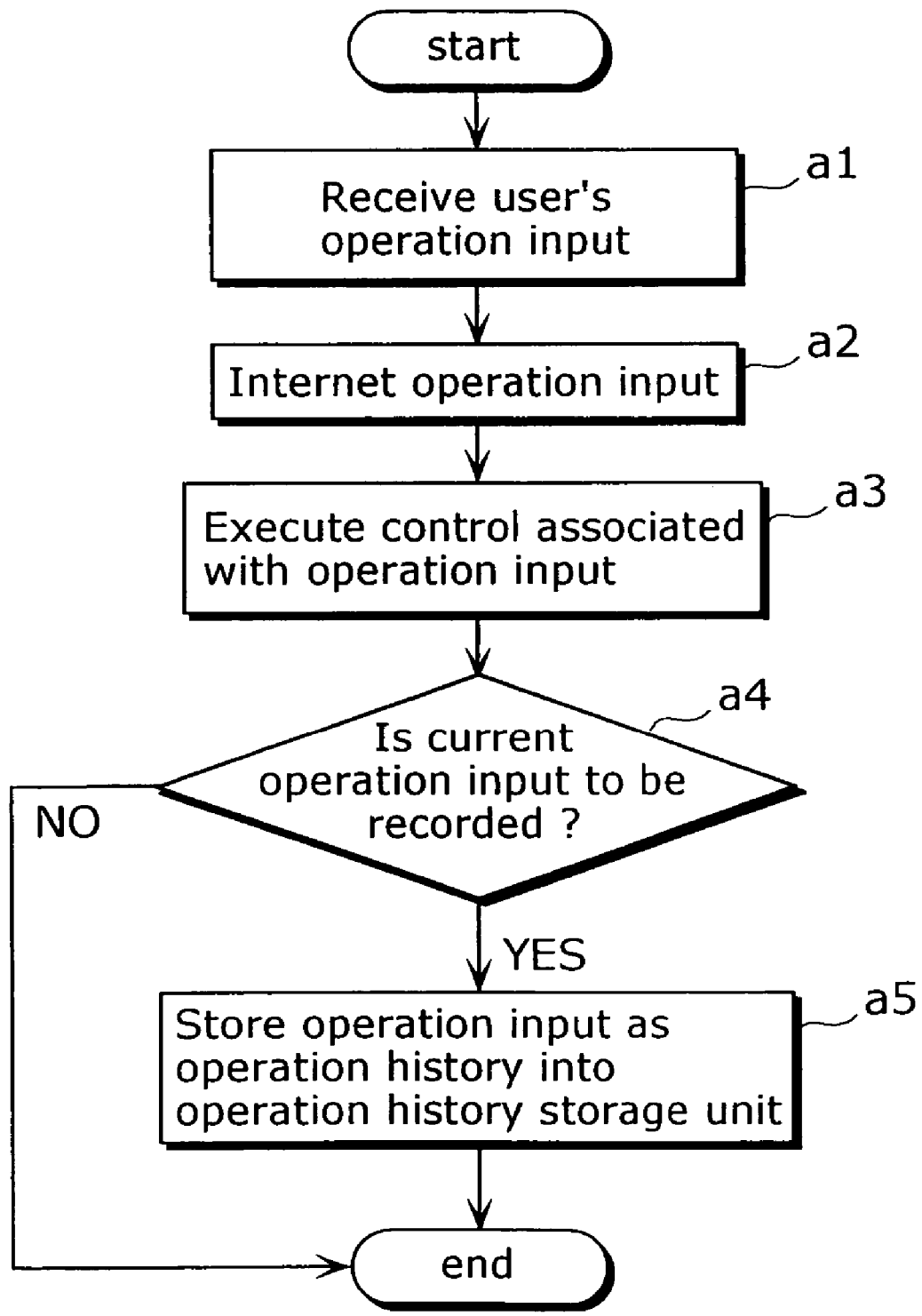
FIG. 5 is a flow chart showing a processing of storing an operation history performed by the device agent as shown in FIG. 4.

Next, operations performed by the device agent 201 will be described using the flow chart as shown in FIG. 5. First, the processing of recording the operation history will be described.

In step a1, the operation input unit 301 receives a remote control operation performed by the user. Here, it is assumed that the temperature of the air conditioner is set at 25 degrees Celsius, and that the user has pressed the button for raising the set temperature included in the remote control twice. Input operations performed by other means than the remote control are processed in the same manner.

In step a2, the operation input interpretation unit 302 interprets the input received in the step a1. Since the button for raising the set temperature has been pressed twice from the temperature state of 25 degrees Celsius, it is interpreted as "changing the set temperature to 27 degrees Celsius". In the case where 27 degrees Celsius is directly specified by the remote control button, the same interpretation is made.

In step a3, the device control unit 303 performs an operation associated with the operation input. In this example, the set temperature is raised by 2 degrees, thereby changed to 27 degrees Celsius.

In step a4, it is examined whether or not the current operation input is to be recorded. As a result of the interpretation of the operation input interpretation unit 302, in the case where it is judged that the operation input should be stored as a history, the processing is proceeded to step a5. Otherwise, the processing is ended. The operations which should be stored as histories are predetermined for each device. FIG. 6 shows an example of such predetermined operations as described above. In the case of the air conditioner, it is shown that as the operation type, the following is to be stored as operation histories: Power On, Power Off, temperature setting, air volume setting, stop and reserve. Changing the temperature setting corresponds with the temperature setting as shown in FIG. 6, thus the step a5 will be described next.

In step a5, the operation history record unit 305 judges that the operation performed at the temperature of 25 degrees Celsius is ended, and the operation performed at the temperature of 27 degrees Celsius has been started. Then, the operation history record unit 305 makes a set of a device type, an operation type identifier, and the argument if required, and records the set into the operation history storage unit 304.

FIG. 7 shows examples of the operation histories recorded in the operation history storage unit 304. In FIG. 7, example 1 shows an operation history of an air conditioner. Here, the operation date and time show the date and time when the operation was performed. The device type is described as "Air Conditioner", the operation type specific identifier is described as "Set" as shown in FIG. 6, and the argument is described as "27". Thereby, it is indicated that the air conditioner was operated at the temperature of 27 degrees Celsius on the operation date and time. Also, the example 2 in FIG. 7 shows an example of a TV, and indicates that a TV program was viewed on the operation date and time, the TV program being uniquely specified by the identification (ID) number XXXXXXX. Furthermore, an operation start date storage unit may be set. And, by previously storing the start date of the operation performed at the temperature of 25 degrees Celsius, the operation start date and the operation end date may be recorded in the operation history storage unit 304, using the current date and time as the operation end date and time at the temperature of 25 degrees Celsius. In such case as described above, the current date and time are stored into the history start date storage unit as the operation start date at the temperature of 27 degrees Celsius. Here, the item of the operation end date and time may be elapsed time after the operation start date and time.

Next, the processing performed by the device agent 201 will be described using FIG. 8, the device agent 201 updating the operation history inputted into the user agent 202. This processing may be performed in parallel with or sequentially after the processing of recording the operation history as shown in FIG. 5.

In step a6, it is examined whether or not a timer interrupt occurs, such as updating the operation history inputted into the user agent 202. In the case where the timer interrupt occurs, the processing is proceeded to step a9. Otherwise, the processing is proceeded to step a7.

In step a7, it is examined whether or not the data stored in the operation history storage unit 304 is full. In the case where the data is full, the processing is proceeded to step a9. Otherwise, the processing is proceeded to step a8.

In step a8, it is examined whether or not there is a request to update the operation history from the user agent 202. In the case where there is a request, the processing is proceeded to step a9. Otherwise, the processing is ended.

In step a9, the operation history is transmitted from the operation history transmission unit 306 to the user agent 202.

In step a10, it is examined whether or not the transmission has been completed. In the case where the transmission has been completed, the processing is proceeded to step a11. Otherwise, the processing is ended.

In step a11, the already transmitted operation histories are deleted from the operation history storage unit 304, and the processing is ended. However, the timing for deleting the transmitted operation histories is not limited to the step a11, and the already transmitted operation histories may be deleted at an arbitrary timing which is convenient for the device agent 201.

Figure 9:
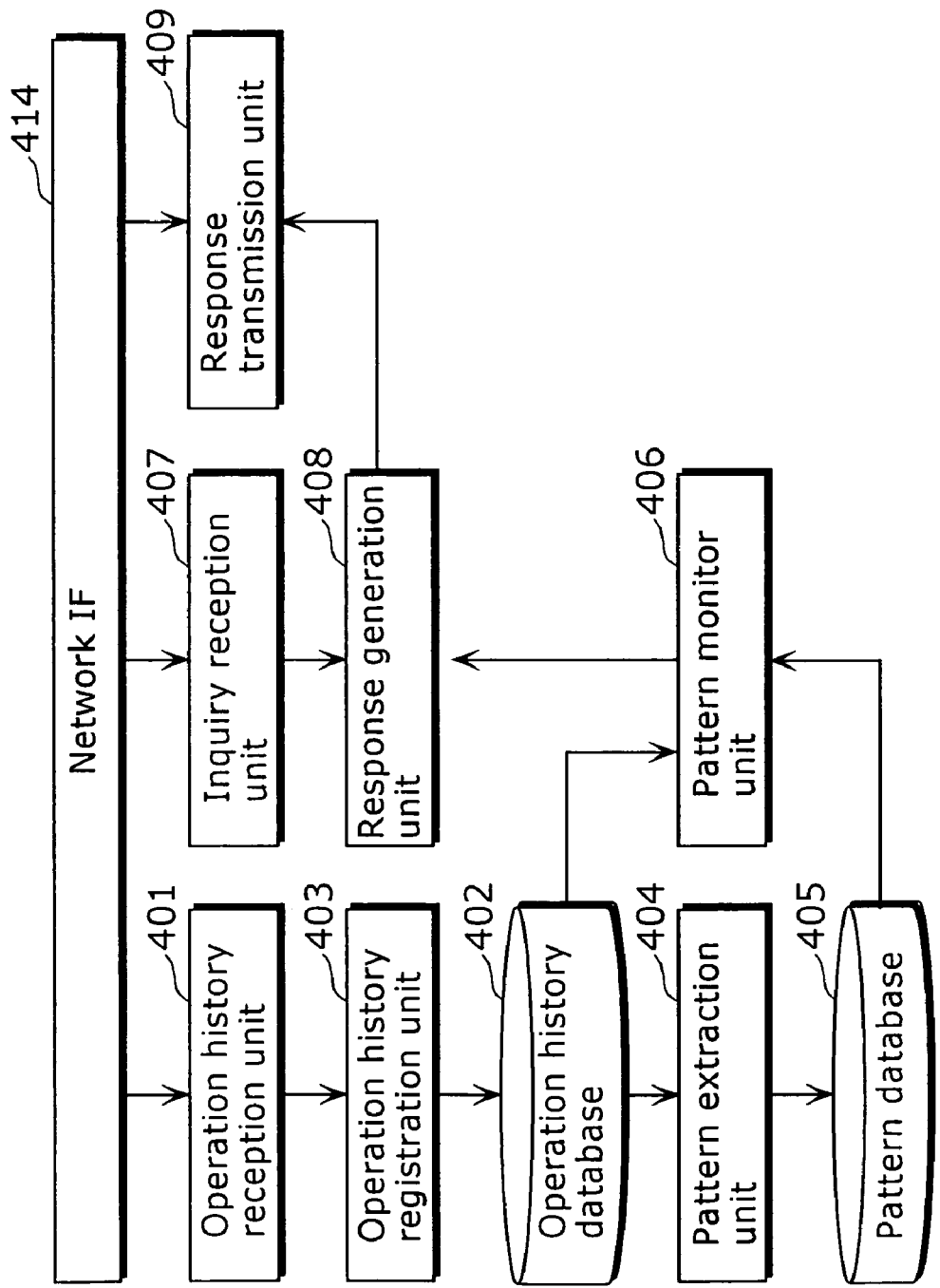
FIG. 9 is a block diagram showing a configuration of a user agent according to the first embodiment of the present invention.

Next, the configuration and operations of the user agent 202 will be described. FIG. 9 is a diagram showing a block configuration of the user agent 202. The user agent 202 includes: an operation history reception unit 401 which receives the operation history transmitted from the device agent 201; an operation history database 402 which stores data of the operation history; an operation history registration unit 403 which registers the data of the operation history received in the operation history reception unit 401 into the data operation history database 402; a pattern extraction unit 404 which extracts appearing patterns of the history that fulfill a predetermined condition from among the operation histories registered in the operation history database 402; a pattern database 405 which stores the appearing patterns of the operation histories extracted in the pattern extraction unit 404; a pattern monitor unit 406 which monitors patterns that correspond with the appearing patterns registered in the pattern database 405 from among the operation history data registered in the operation history database 402 or the operation history data newly registered by the operation history registration unit 403; an inquiry reception unit 407 which receives an inquiry request from the service concierge 203; a response generation unit 408 which (i) searches data using the operation history database 402 and the pattern monitor unit 406 in response to the details of the inquiry received by the inquiry reception unit 407, and (ii) generates a response for the inquiry; a response transmission unit 409 which transmits the response generated by the response generation unit 408 in response to the service concierge 203 which has transmitted the inquiry; and a network IF 414.

Figure 10:
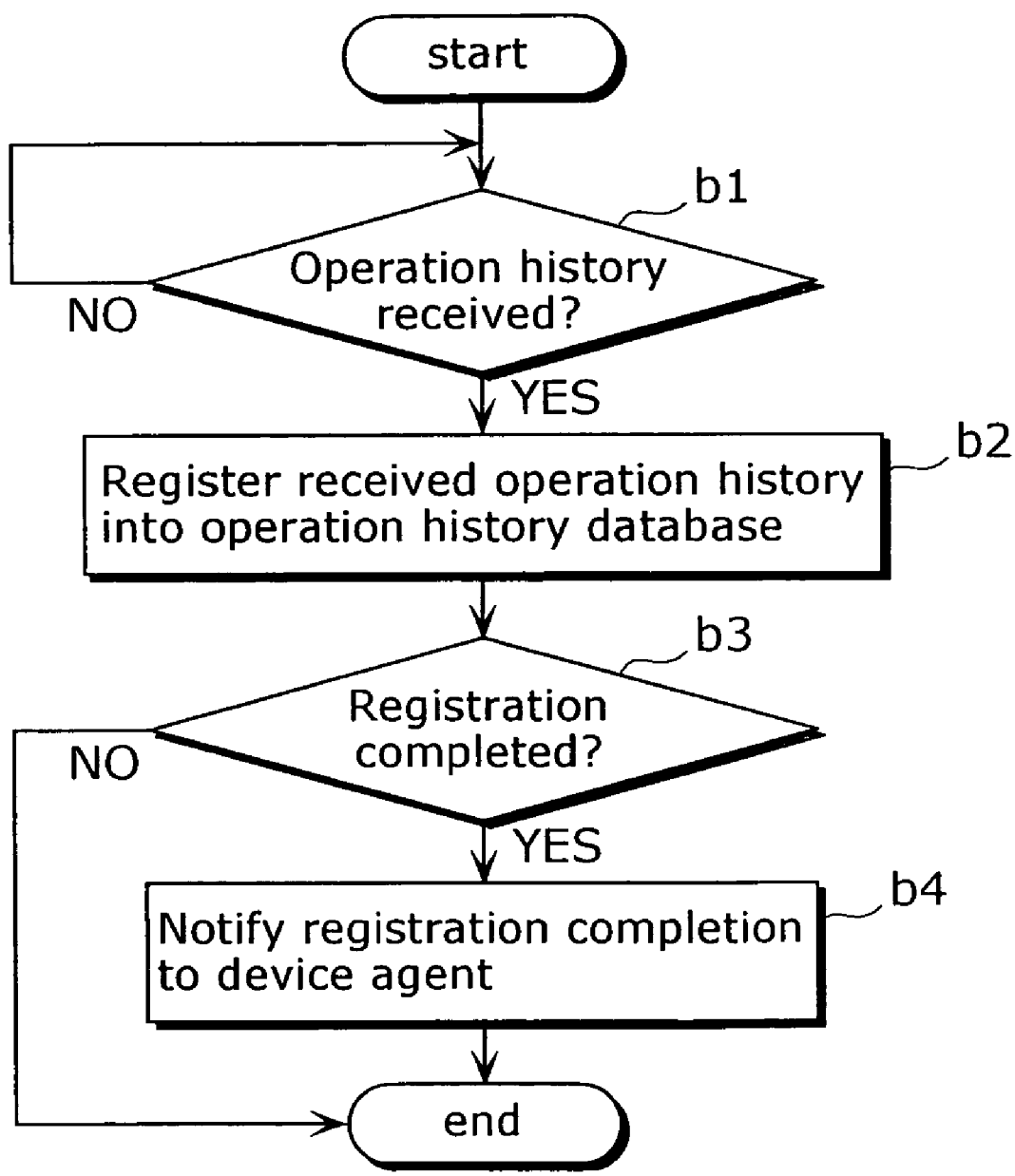
FIG. 10 is a flow chart showing a processing of registering an operation history performed by the user agent as shown in FIG. 9.

Next, the operations performed by the user agent 202 will be described using a flow chart as shown in FIG. 10. First, the following processing will be described: the operation history transmitted from the device agent 201 is registered into the operation history database 402.

In step b1, the operation history reception unit 401 examines whether or not the operation history has been received from the device agent 201. In the case where the operation history has been received, the processing is proceeded to step b2. Otherwise, the performance of the step b1 is continued in a predetermined cycle.

In step b2, the operation history registration unit 403 extracts the operation history received by the operation history reception unit 401, and registers the extracted operation history into the operation history database 402. FIG. 11 shows an example of data stored in the operation history database 402. The operation histories transmitted from a plurality of device agents are stored in the order of the operation date and time.

In step b3, it is examined whether or not the registration has been completed. In the case where the registration into the operation history database 402 has been completed without errors, the processing is proceeded to step b4. Otherwise, the processing is ended.

In step b4, a registration completion notification is returned to the device agent 201 which is the transmission source of the operation history, and the processing is ended.

Figure 12:
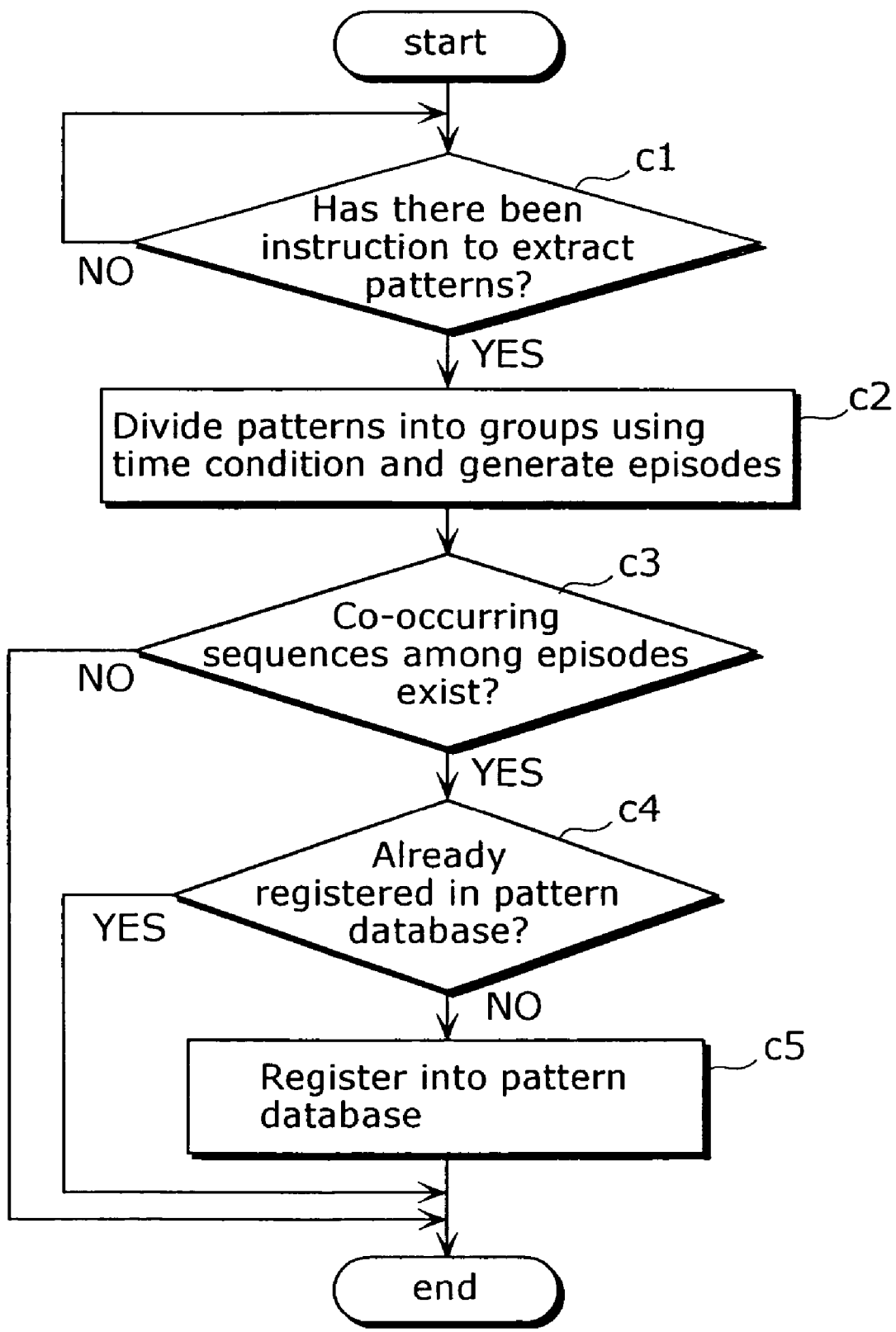
FIG. 12 is a flow chart showing a processing of extracting operation sequence patterns performed by the user agent as shown in FIG. 9.

Next, the processing of extracting operation sequence patterns performed by the user agent 202 will be described using a flow chart as shown in FIG. 12.

In step c1, it is examined whether or not there has been an instruction to extract patterns. In the case where the inquiry reception unit 407 received the inquiry from the service concierge 203, or in the case where the pattern extraction unit 404 receives a command to update operation history pattern extraction which periodically occurs inside the user agent 202, the processing is proceeded to step c2.

In step c2, the pattern extraction unit 404 refers to the operation history data registered in the operation history database 402, and classifies the operation history data into groups using a constant condition regarding time. Data as shown in FIG. 11 is registered in the operation history database 402. By sorting the registered data based on the operation date and time, in the case where the interval between the adjacent data is a predetermined time or less, the adjacent data is classified as the same group. For example, in the case where the condition is set as that the interval between the adjacent data is 5 minutes or less, the data can be classified into five groups such as 1001 to 1005 as shown in FIG. 11.

FIG. 13 shows clusters of operation sequences for the respective groups classified as described above. Such a cluster of operation sequences which belong to one group is called an episode. The occurrence order of the operation sequences in one episode may be or may not be considered. Here, the occurrence order is not considered.

In classifying the clusters of operation sequences into groups, the above description described the case where the time interval between the adjacent data is a predetermined time or less, as a simple method. However, there is a method of classifying the clusters of operation sequences into groups using a constant time interval. For example, by setting the time interval as ten minutes, groups are classified as follows: from every hour to ten minutes past; from ten minutes past to twenty minutes past; and from twenty minutes past to thirty minutes past (hereinafter in the same manner).

Going back to FIG. 12, in step c3, it is examined whether or not co-occurring sequences among the episodes exist. In the case where the same or partially corresponding sequences exist among the episodes generated in the step c2, the processing is proceeded to step c4. Otherwise, the processing is ended. For example, among the episodes as shown in FIG. 13, the episodes 1001 and 1004 completely correspond with each other. Also, the episodes 1003 and 1005 correspond with each other in the part "TV-PowerOff, MD-Play". Thus, the corresponding two episodes or the corresponding part of the episodes become candidates to be registered as frequent operation sequence patterns into the pattern database 405. Here, as a condition to judge the correspondence or partial correspondence among the episodes, it is assumed that a predetermined number or more factors included in the episodes correspond with each other, the predetermined number being two.

Figures 14, 15:
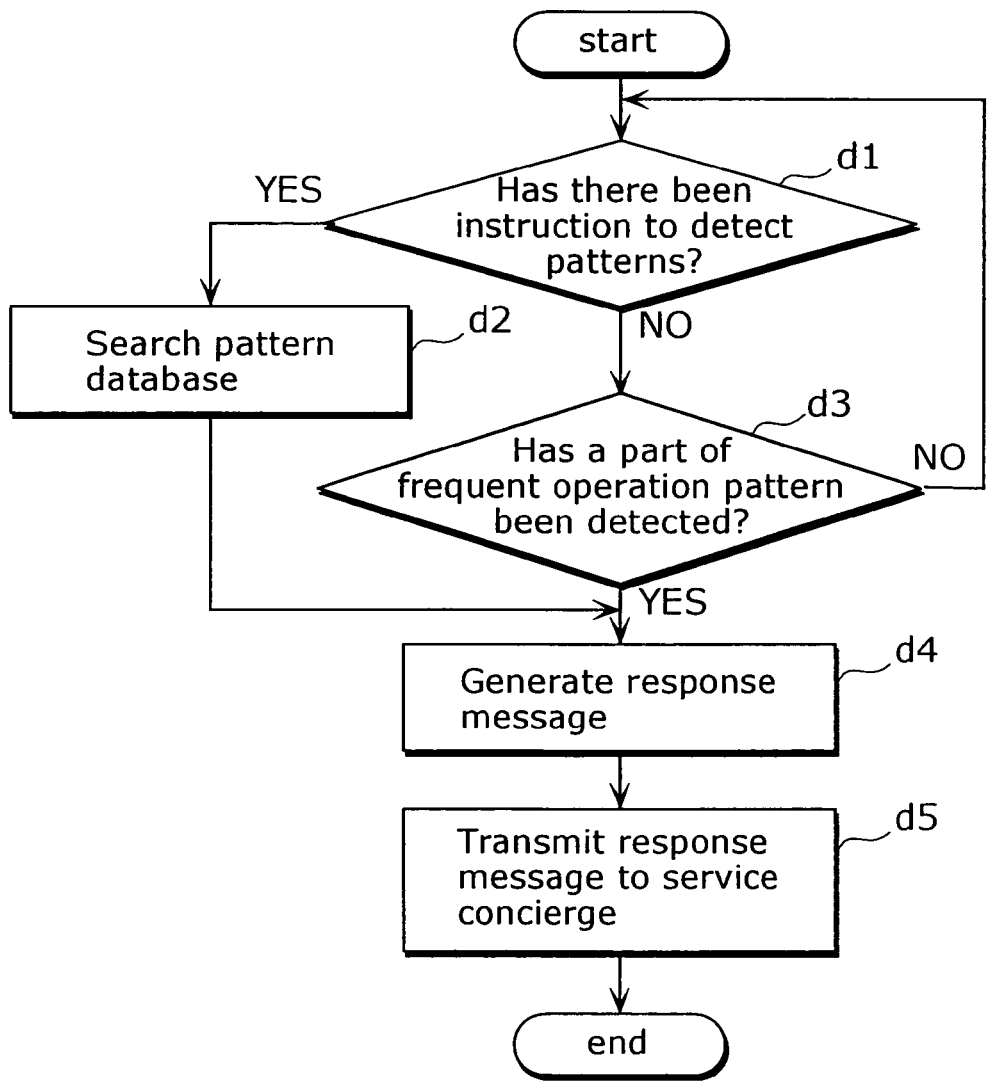
FIG. 14 is a diagram showing frequent operation patterns obtained from the episodes as shown in FIG. 13.
FIG. 15 is a flow chart showing a processing of responding to a service concierge performed by the user agent as shown in FIG. 9.

In step c4, it is examined whether or not the frequent patterns extracted in the step c3 are the patterns already registered in the pattern database 405. In the case where the extracted frequent patterns are not registered yet, the processing is proceeded to step c5. In the case where the frequent patterns are already registered, the processing is ended. In step c5, the frequent patterns extracted by the pattern extraction unit 404 are registered into the pattern database 405. FIG. 14 shows an example data of the frequent operation patterns registered in the pattern database 405 as described above. For example, the data No. 1 in FIG. 14 shows that the action, "after turning on TV, select a channel and turn on air conditioner", is a formed pattern. And, the data No. 2 shows that the action, "after turning off TV, listen to MD", is a formed pattern.

Next, the processing of responding to the inquiry from the service concierge 203 will be described using the flow chart as shown in FIG. 15. The following two processings are performed in parallel: the processing of registering the operation history into the operation history database 402 as shown in FIG. 10; and the processing of responding to the inquiry as shown in FIG. 15.

In step d1, the inquiry reception unit 407 examines whether or not an inquiry from the service concierge 203 has been received. In the case where the inquiry has been received, the processing is proceeded to step d2. Otherwise, the processing is proceeded to step d3. A communication protocol and a message format used for the inquiry may be arbitrarily used. For example, Hyper Text Transfer Protocol (HTTP) may be used for the communication protocol, and extensible Markup Language (XML) may be used for the message format.

In step d2, the response generation unit 408 interprets the inquiry, and the operation history database 402 is searched. There are the following types of inquiries: (1) what kind of frequent operation patterns exist in a specified period?, (2) what kind of frequent operation patterns including a specified device exist?, (3) what kind of frequent operation patterns including a specified operation exist?, (4) when a specified frequent operation pattern occurred?, (5) when a frequent operation pattern including a specified device and a specified operation occurred, and the like.

In step d3, the pattern monitor unit 406 monitors the operation history sequence which has been additionally registered into the operation history database 402 by the operation history registration unit 403. In the case where the frequent operation pattern sequence or a part of the frequent operation pattern sequence has been detected, the frequent operation pattern sequence or the part of the frequent operation pattern being already registered, the processing is proceeded to step d4. Otherwise, the processing is returned to the step d1. For example, in the case where the frequent operation patterns as shown in FIG. 14 are registered in the pattern database 405, when the pattern monitor unit 406 detects the sequence, "TV-PowerOn, TV-Play", since the sequence is a part of the frequent operation pattern No. 1, the processing is proceeded to step d4.

In steps d4 and d5, the results of the steps d2 and d3 are encoded to the response format, and the response transmission unit 409 transmits the response to the service concierge 203 which is the transmission source of the inquiry message. In the case where the response is transmitted in the step d2, the response is transmitted according to the details of the inquiry from the service concierge 203. In the case where the response is transmitted in the step d3, the user's next predicted action is transmitted as the response. In other words, in the example as shown in the step d3, "AirConditioner-PowerOff" is transmitted as the response.

According to the above mentioned configuration and operation, in the case where the service concierge 203 inquires, to the user agent 202, "what is the user's frequent operation pattern like?", it is possible to respond, "after turning off TV, listen to music on MD". And, to an inquiry such as "what kind of action is taken when turning on TV?", it is possible to respond as "after selecting a channel, turn on air conditioner".

Figure 16:
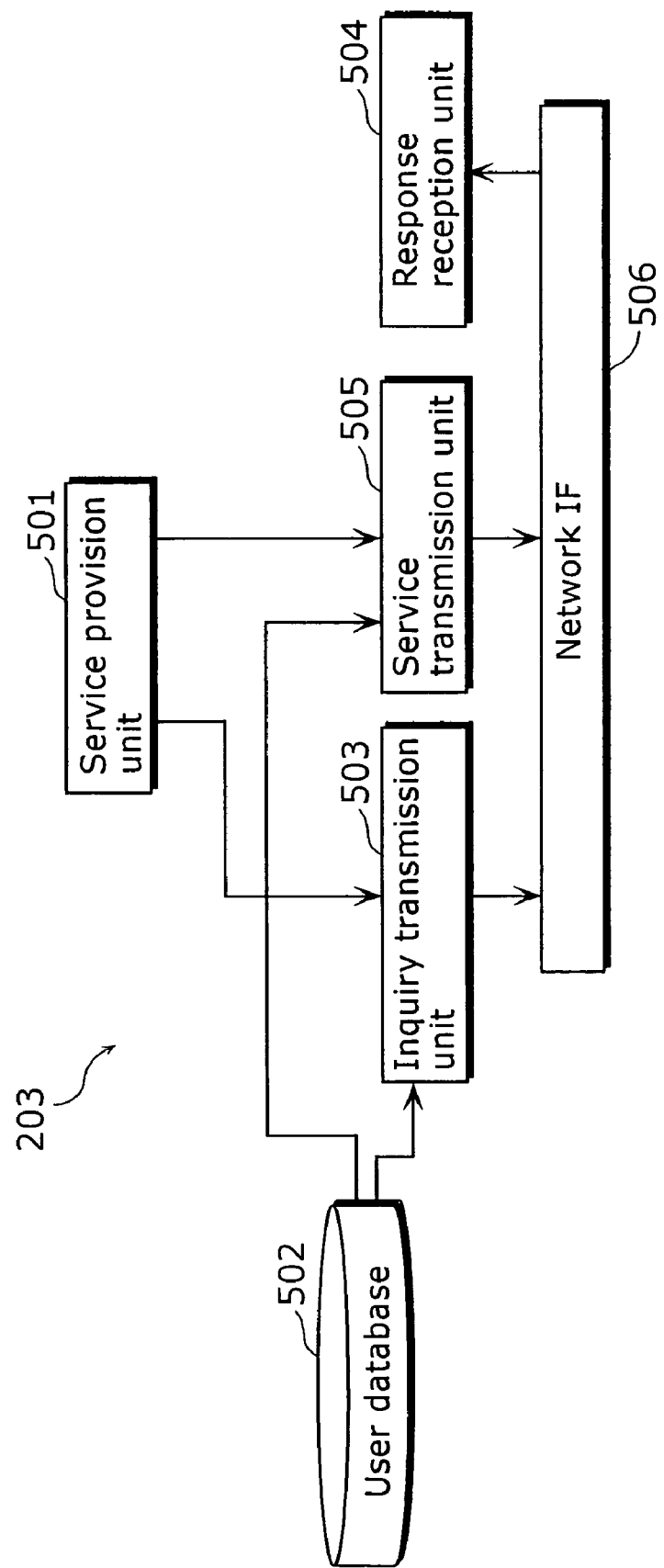
FIG. 16 is a block diagram showing a configuration of a service concierge according to the first embodiment of the present invention.

Next, the configuration of the service concierge 203 will be described, the service concierge 203 providing service based on the above mentioned information. FIG. 16 is a block diagram showing the configuration of the service concierge 203. The service concierge 203 includes: a service provision unit 501 which provides service such as device control and providing information to the terminal electric device 101; a user database 502 which stores (i) a location of the user agent 202 of the user who has a contract for a service provision by the service concierge 203 and (ii) information of the terminal electric device 101 which receives service; an inquiry transmission unit 503 which transmits an inquiry inputted by the service provision unit 501 to the user agent 202; a response reception unit 504 which receives a response message from the user agent 202; a service transmission unit 505 which transmits service to the terminal electric device 101 based on the response received in the response reception unit 504; and a network IF 506.

The service concierge 203 can provide the user with the service such as the device control and providing information based on the information obtained in response to the inquiry to the user agent 202. In other words, in the case where it is understood that "after turning off TV, listen to music on MD", when it is detected that the user has turned off TV, it is possible to provide service such as automatically turning on the power of MD stereo.

In addition to the above mentioned example of Audio and Video (AV) devices, there are other conceivable cases as follows: a frequent operation pattern involving air conditioner and light such as "after the electronic lock is opened at the entrance, turn on the light in the room and turn on the air-conditioner"; and a frequent operation pattern involving cooking device such as "after turning on the microwave cooking device, turn on the fan".

Furthermore, there are various other conceivable cases as follows: a frequent operation pattern in view of security such as "after turning off all of electric devices in home and going out, lock the electronic lock"; a frequent operation pattern in view of education such as "after turning off TV, turn on the light in the study room and also turn on the light at the study desk"; a frequent operation pattern in view of health care such as "after operating a running machine, prepare a hot bath"; and a frequent operation pattern in view of welfare such as "after the state of a supporting bed is changed from a sleeping position to a sitting position, turn on TV".

In the present embodiment, the time interval for distinguishing one episode is set as five minutes or less. However, by lengthening the interval time, it is possible to generate a frequent operation pattern such as "thirty minutes after a microwave cooking or a microwave oven are turned off (after the meal is finished), turn on TV".

As described above, according to the present embodiment, the frequent operation pattern involving the user's device is detected and managed. Then, information of the frequent operation pattern is transmitted to the service concierge 203. Thereby, it is possible to provide service according to the user's ordinary action pattern.

Also, the present embodiment can be applied to a wide range of fields as follows: an entertainment field such as AV devices; an electric device field such as cooking and air-conditioning; security; education; health care; and welfare. Thus, the present embodiment can be used in various service fields.

The present embodiment describes only one example of the method for extracting the frequent operation patterns as described above using FIG. 12. Therefore, there may be other cases of the method for classifying operation sequences into groups based on a certain criterion and generating episodes, and then extracting operations which partially correspond with each other or co-occur among episodes.

In addition, in the method for responding to the service concierge 203 as described in FIG. 15 in the present embodiment, not all of the steps d1, d2 and d3 need to be included, and only one of the steps d1, d2 and d3 may be included.

Second Embodiment

In the second embodiment, in addition to extracting the user's operation sequence patterns, the function sequence patterns are extracted, the function sequence patterns being meant by the operation.

Figure 17:
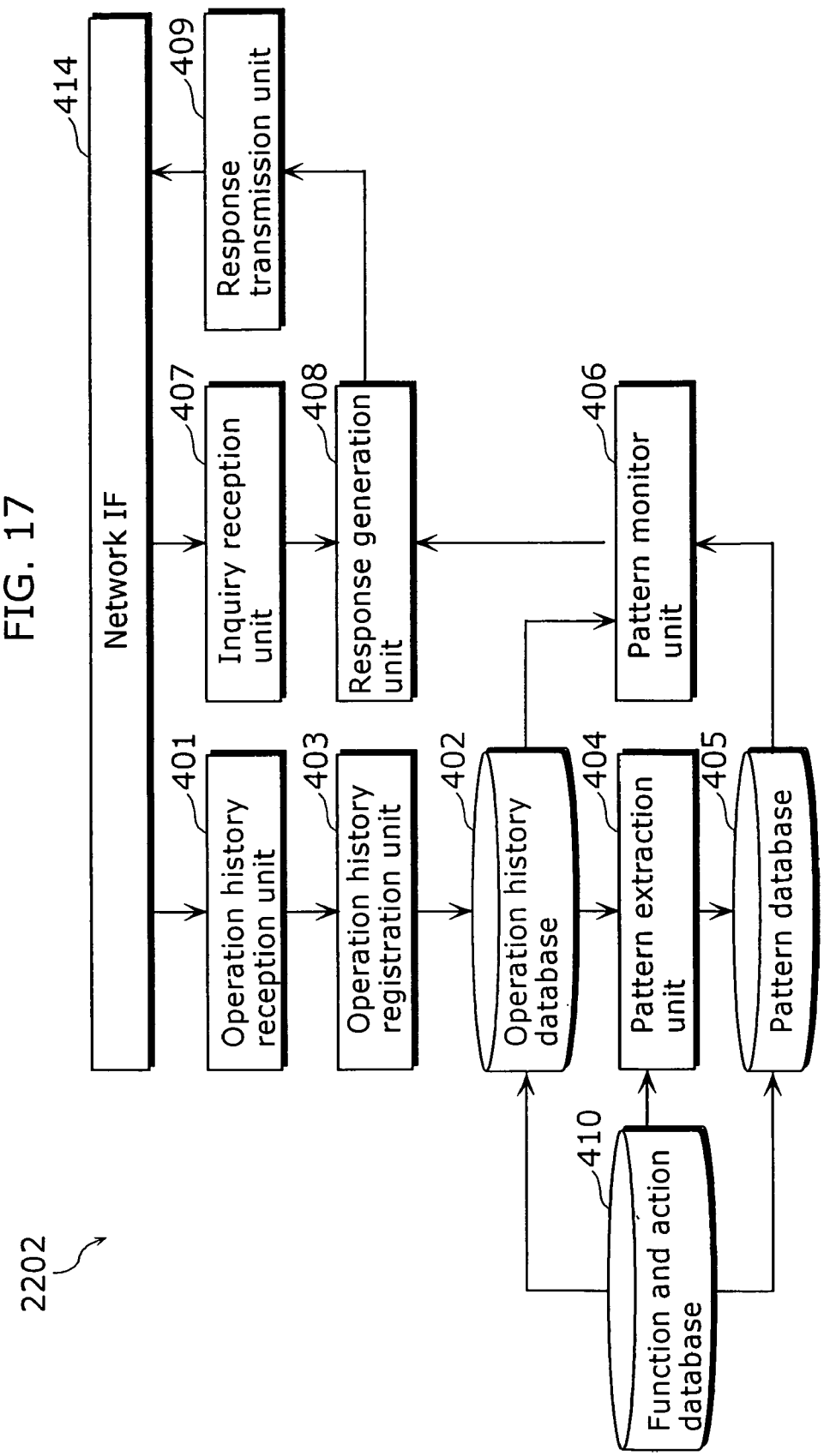
FIG. 17 is a block diagram showing a configuration of a user agent according to the second embodiment of the present invention.

FIG. 17 is a block diagram showing a configuration of the user agent 2202 according to the second embodiment. In addition to the configuration of the user agent 202 according to the first embodiment as shown in FIG. 9, the user agent 2202 according to the second embodiment includes a function and action database 410. Among the components as shown in FIG. 17, the already described ones are assigned with the same codes, and concrete description will be omitted.

The function and action database 410 is a function and action database which defines at least one of the following relations: (i) a relation between the user's operation performed on various devices and a function provided to the user in response to the operation; and (ii) a relation between the user's operation performed on various devices and an action predicted as desired by the user performing the operation.

FIG. 18 shows an example of details registered in the function and action database 410. In addition to the list of the operation type specific identifiers as shown in FIG. 6, FIG. 18 describes which category each operation is classified into at the meta function level. For example, since both "Play" of TV and "Play" of video are the same in the functional aspect of watching the video contents, "Watch" is provided as the function identifier. On the other hand, in the case of "Play" of radio, the quality is different from watching TV and video in the sense of listening to music and speech, "Listen" is provided as the function identifier. This is the same in the case of "Play" of MD. Also, since (i) turning on the power of the air conditioner at the room temperature of 25 degrees Celsius or higher and (ii) turning on the power of fan are the same in the functional aspect of cooling the room, the function identifier, "Cool" is provided.

Figure 19:
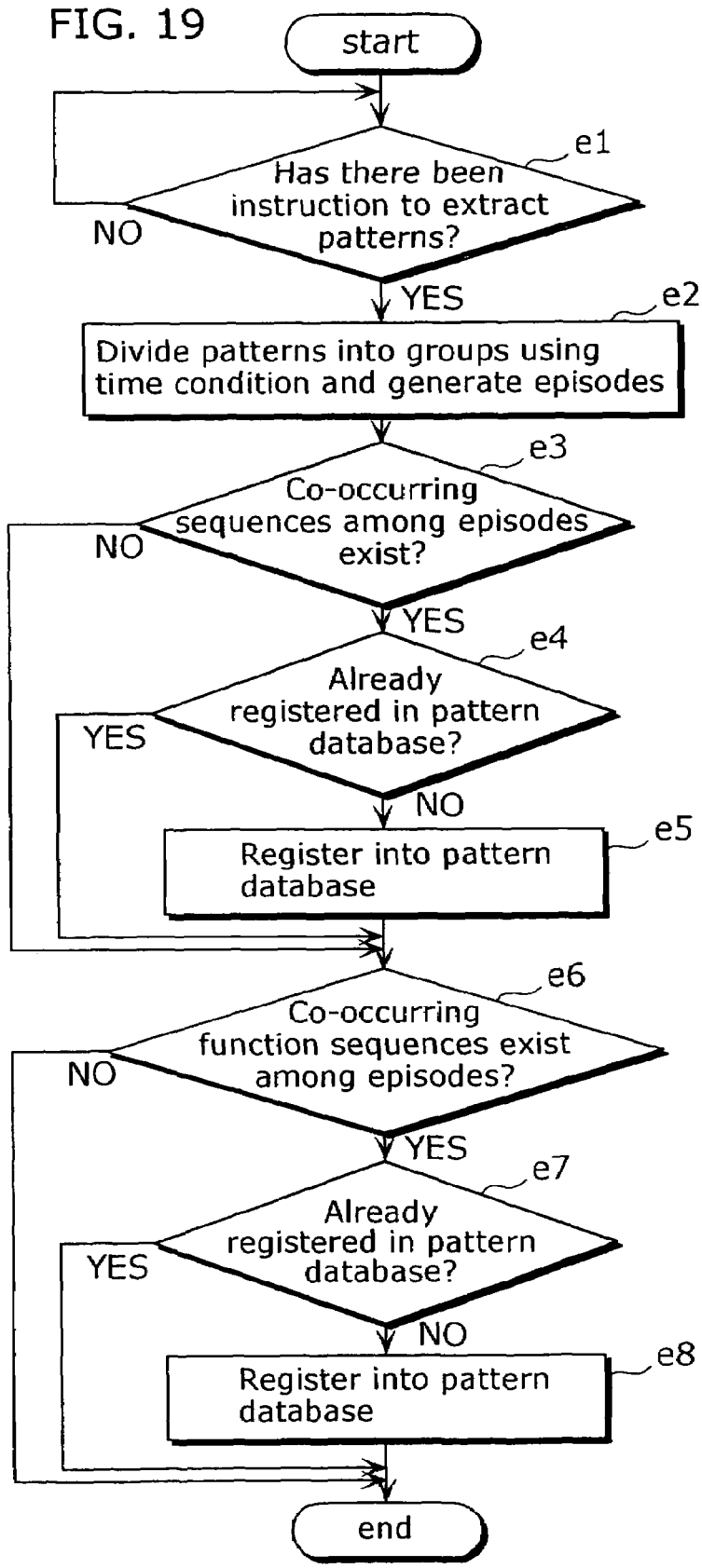
FIG. 19 is a flow chart showing a processing of extracting operation sequence patterns and a processing of extracting function sequence patterns respectively performed by the user agent as shown in FIG. 17.

The following procedures will be described referring to a flow chart as shown in FIG. 19: the user agent 2202 including the function and action database 410 extracts frequent operation patterns and frequent function patterns. Here, (i) the block configuration and operations of the device agent 201 included in each terminal electric device 101 and (ii) procedures of updating the operation history data in the user agent 2202 are the same as the first embodiment, thus the description will be omitted. Also, the operation history data as shown in FIG. 20 is registered in the operation history database 402 included in the user agent 2202.

Steps e1 to e5 as shown in FIG. 19 are the same as the operations of the steps c1 to c5 as shown in FIG. 12 according to the first embodiment. In other words, first, episodes are generated using time condition. FIG. 21 shows episodes generated based on FIG. 20. Next, the same episodes or partially corresponding episodes are extracted and registered into the pattern database 405. The operation sequences of the episodes 2002 and 2004 as shown in FIG. 21 partially correspond with each other, thus the details, that is, the details as shown in FIG. 22 are registered as a frequent operation pattern into the pattern database 405.

In step e6, in addition to the operation sequences, the function sequences are paid attention to. The column of the function sequences as shown in FIG. 21 shows the operation sequences replaced with the corresponding function identifiers as defined in FIG. 18. In the step e6, these function sequences are referred to. And, in the case where there are the same function sequences or partially corresponding function sequences among the episodes generated in step e2, the processing is proceeded to step e7. Otherwise, the processing is ended. For example, among the episode as shown in FIG. 21, the operation sequences of the episodes 2001 and 2003 do not correspond with each other, but the function sequences of the episodes 2001 and 2003 completely correspond with each other.

Also, the episodes 2002 and 2004 partially correspond with each other. Thus, the processing is proceeded to step e7, making these episodes candidates to be registered as frequent function sequence patterns into the pattern database 405.

In step e7, it is examined whether or not the frequent function patterns extracted in the step e6 are the patterns already registered in the pattern database 405. In the case where the extracted frequent function patterns are not registered yet, the processing is proceeded to step e8. In the case where the extracted frequent function patterns are already registered, the processing is ended.

In step e8, the frequent patterns extracted in the pattern extraction unit 404 are registered into the pattern data base 405.

FIG. 23 shows an example data of the frequent function patterns registered in the pattern database 405 as described above. For example, data No. 1 as shown in FIG. 23 shows a formed pattern of an action, "when watching video (such as TV or video), cool the room". And, data No. 2 shows a formed pattern of an action, "after finishing watching the video, listen to music".

As described above, by registering, into the pattern database 405, the frequent patterns not only at the operation level but also at the function level, it is possible to return more diverse details to the service concierge 203. For example, when comparing the frequent function pattern No. 2 as shown in FIG. 23, "Stop-Watch, Listen", with FIG. 18 that defines function identifiers, it can be found that the following four types exist as the operation patterns corresponding to the above mentioned function pattern: "TV-PowerOff, MD-Play", "TV-PowerOff, Radio-PowerOn", "Video-Stop, MD-Play" and "Video-Stop, Radio-PowerOn". All of these four types of operation patterns are sequences of a function, "after finishing watching video content, listen to music". Thus, in such case as described above, when the pattern monitor unit 406 detects "TV-PowerOff" that is a function, "having finished watching video content", it is possible to predict that as the next function, an operation of "listening to music" such as "PowerOn" of radio or "Play" of MD occur. The user agent 2202 returns such prediction result to the service concierge 203. Thereby, the service concierge 203 can predict a quality level of the user's next desired action and function, and can provide service accurately according to the predicted quality level.

Figure 24:
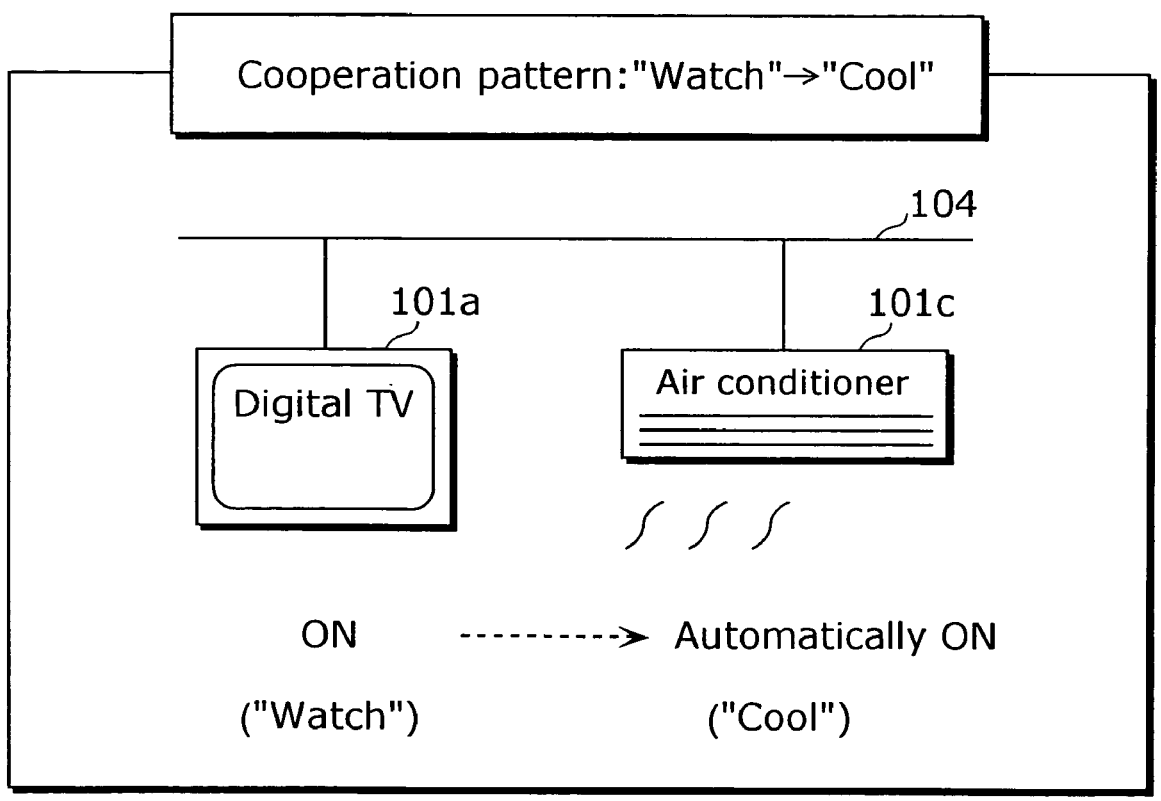
FIG. 24 is a diagram showing a concrete operational example (Part I) in an operation history utilization system according to the second embodiment.

FIG. 24 is a diagram showing a concrete operational example (Part I) of the operation history utilization system according to the present embodiment. Here, as a cooperation pattern of function sequences, an example of "Watch-Cool" is shown. In other words, an example of automatic control is shown such as that after turning on TV 101a in the living room where there is an air conditioner (cooling) 10c, the air conditioner 101c automatically operates.

Figure 25:
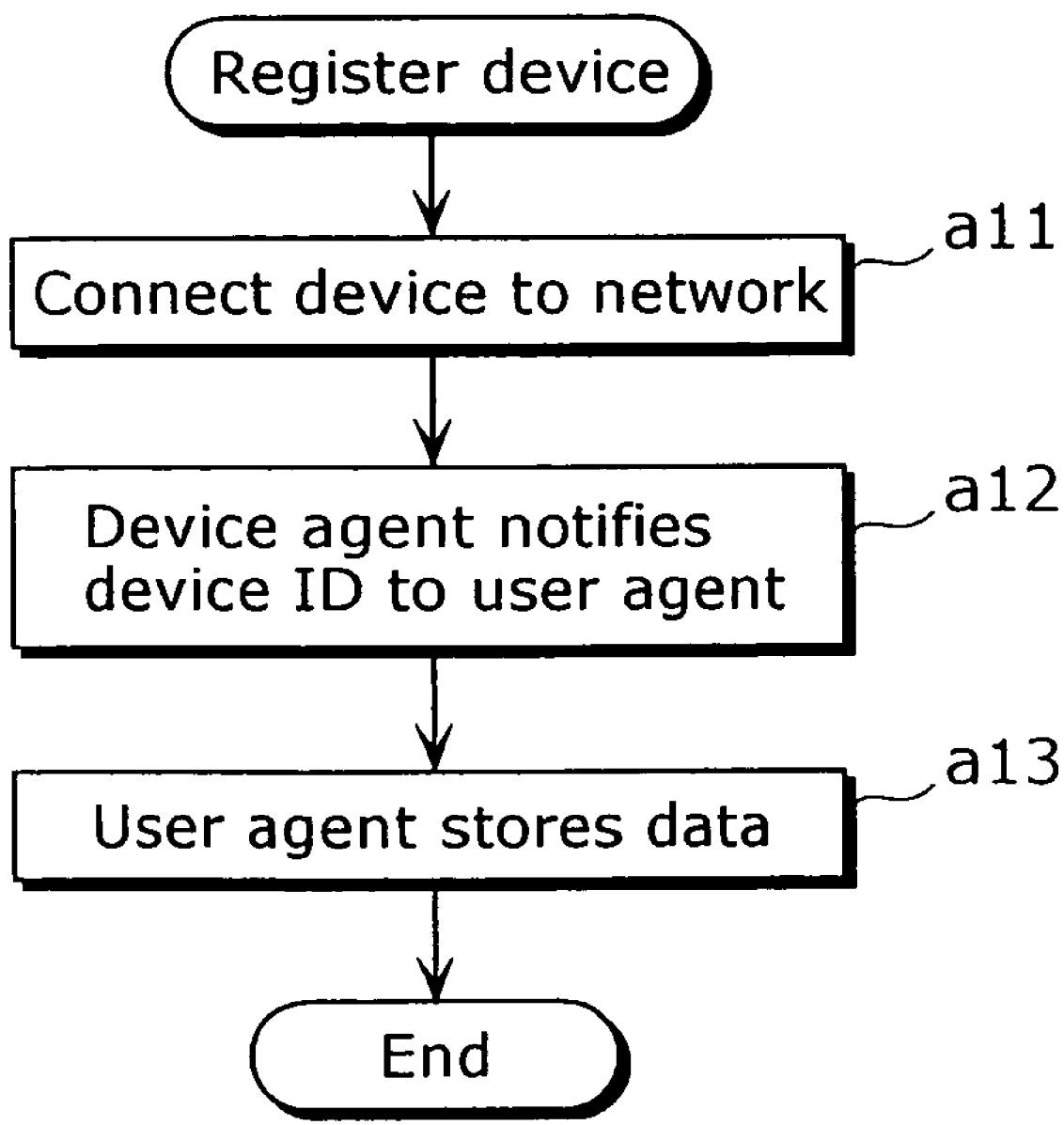
FIG. 25 is a flow chart showing processing procedures of "registering a terminal electric device" as in the operational example performed in the operation history system as shown in FIG. 24.

FIG. 25 is a flow chart showing processing procedures of "registering of terminal electric devices" as in the operational example performed in the operation history system as shown in FIG. 24. Here, in the case where a new terminal electric device 101 is connected to the LAN 104 (step a11), the device agent 201 included in the terminal electric device 101 notifies the user agent 2202 of the device ID, the device type (such as TV and air conditioner), the command list and the like (step a12). The user agent 2202 stores the received information into a management unit (not shown in the drawing) related to connected device information in the operation history database 402, thereby completes the registration of the terminal electric devices (step a13). Here, the command list is stored in such form as shown in FIG. 11.

Figure 26:
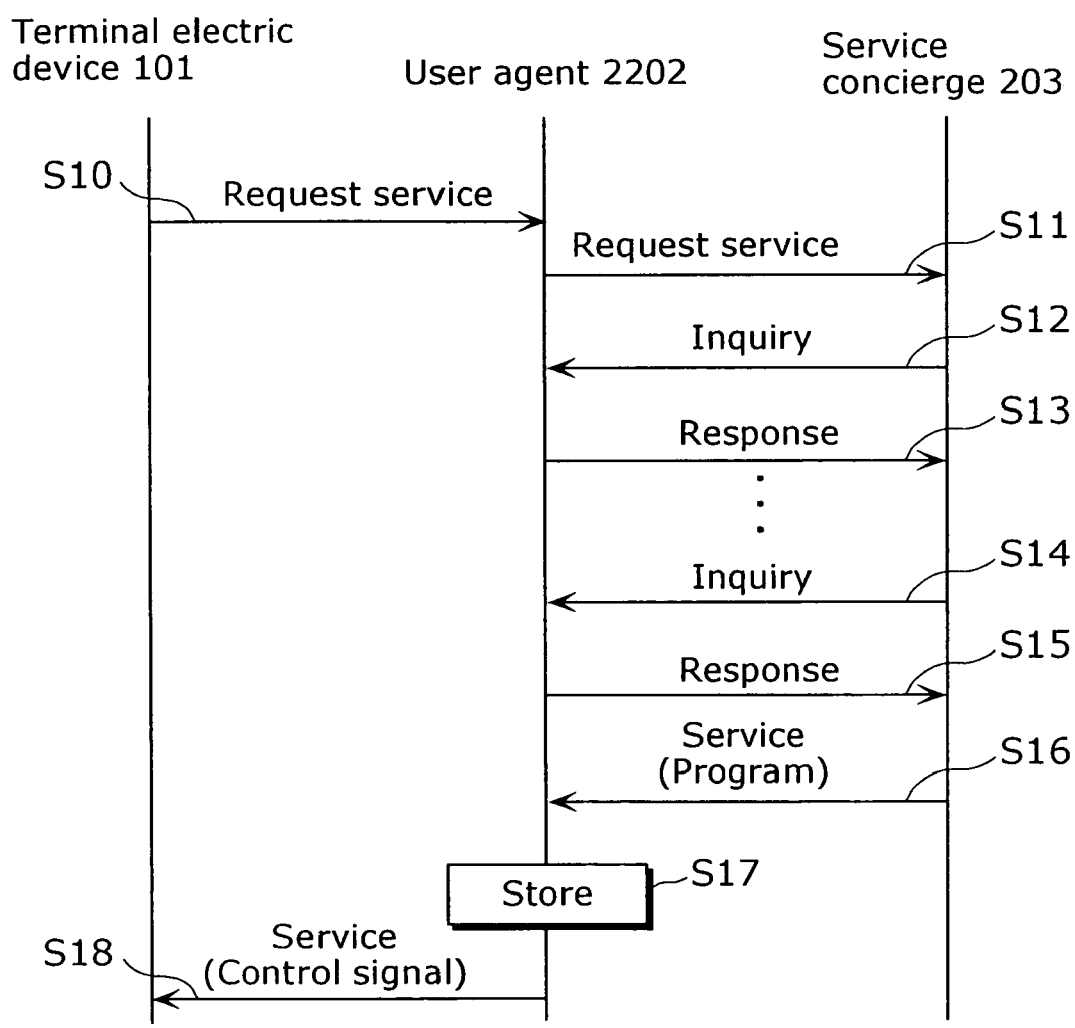
FIG. 26 is a communication sequence diagram showing procedures of a method for providing service (interactive provision method) used as in the operational example of the operation history system as shown in FIG. 24.

FIG. 26 is a communication sequence diagram showing procedures of a method (here, an interactive provision method) for providing service as in the operational example performed in the operation history utilization system as shown in FIG. 24.

First, the terminal electric device 101 requests new service provision (S10). The user agent 2202 once receives this request. Then, the user agent 2202 notifies the service concierge 203 of information regarding the user agent 2202 and the requested service details. For example, a service such as "providing a control program for automatically operating an air conditioner" is requested from an operation unit of an air conditioner or from an information control panel in home.

Next, the service concierge 203 receives a service request from the user agent 2202 (S11). The service concierge 203 records, into the user database 502, information regarding the user agent 2202 and information regarding service details. For example, the service concierge 203 receives, as a request, "providing a control program for automatically operating an air-conditioner", from the user agent 2202 whose IP address is 192.168.10.128.

Next, the service provision unit 501 issues an inquiry from the inquiry transmission unit 503 to the user agent 2202 in order to obtain information required for providing service (S12). For example, an inquiry such as "along what kind of operations performed by other devices, should the power of the air conditioner be turned on?" is issued.

In response to the above mentioned inquiry, in the user agent 2202, the pattern monitor unit 406 refers to the pattern database 405 and the operation history database 402 regarding the details of the received inquiry, and the response is returned to the service concierge 203 (S13). For example, in response to the above mentioned example, referring to the pattern database, a response such as "the power of the air conditioner should be turned on along the operation of turning on the power of TV" is returned.

Then, the above mentioned inquiry and response are repeated until the service concierge 203 completes collecting information required for providing service (S14 and S15). For example, in addition to the above mentioned example, an inquiry such as "along what kind of operations performed by other devices, should the air conditioner be turned off?" is made, and the response to the inquiry is returned.

Next, the service provision unit 501 of the service concierge 203 provides service to the user agent 2202 (S16). For example, "a program for automatically controlling an air conditioner in cooperation with the power operation of TV" is returned to the user agent 2202 whose IP address is 192.168.10.128.

The user agent 2202 receives the transmitted service, and stores the service into a service storage management unit which is not shown in the drawing (S17). When detecting a timing for providing service to the terminal electric device 101, the user agent 2202 provides stored service such as transmitting a control signal based on the program (S18).

As described above, when service is required, the service concierge 203 inquires the user agent 2202 about the usage status of the terminal electric device 101. Thereby, the service concierge 203 can provide the optimum service such as automatic remote control to the terminal electric device 101.

Figure 27:
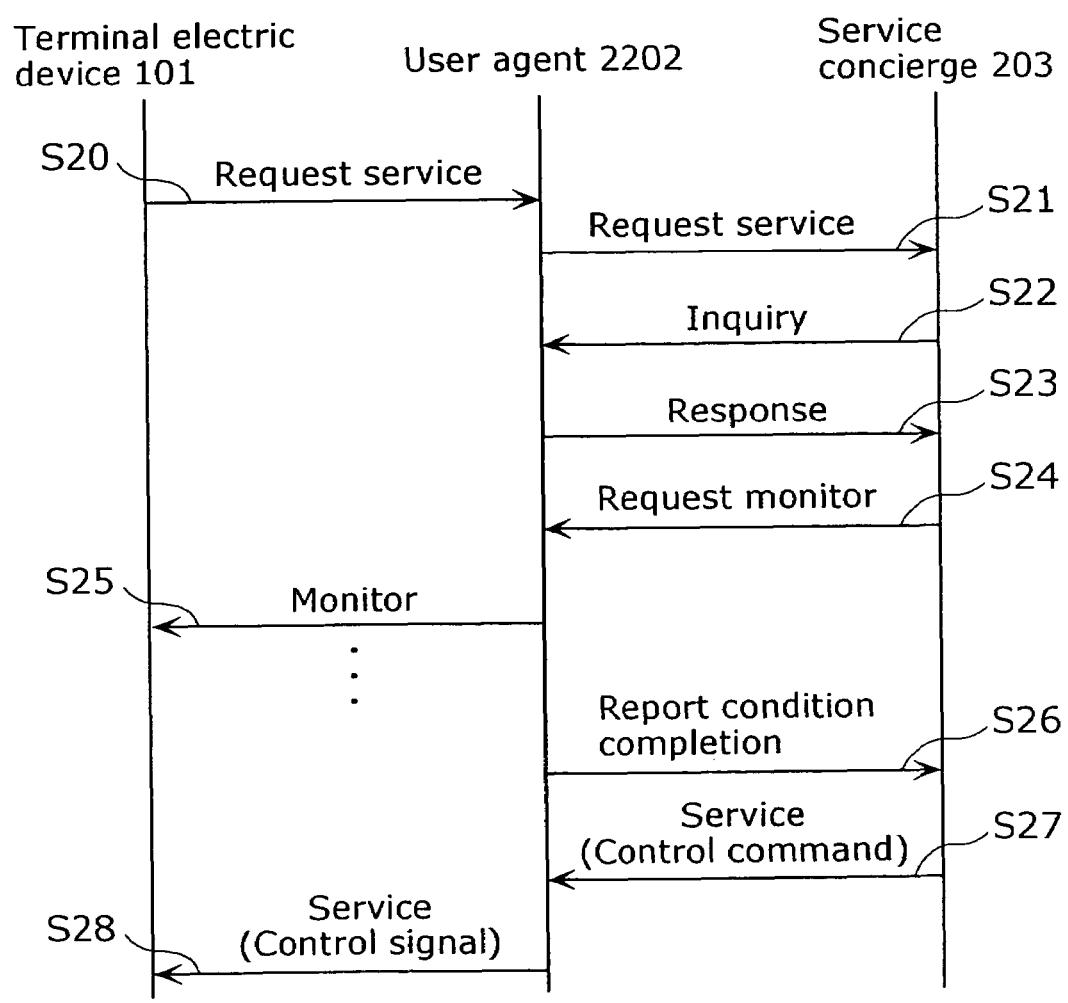
FIG. 27 is a communication sequence diagram showing procedures of a method for providing service (real-time provision method) used as in the operational example of the operation history system as shown in FIG. 24.

FIG. 27 is a communication sequence diagram showing procedures of a method (here, a real-time provision method) for providing service as in the operational example performed in the operation history utilization system as shown in FIG. 24.

First, the terminal electric device 101 requests new service provision (S20). The user agent 2202 once receives this request. Then, the user agent 2202 notifies the service concierge 203 of information regarding the user agent 2202 and the requested service details. For example, a service such as "control for automatically operating an air conditioner" is requested from an operation unit of an air conditioner or from an information control panel in home.

Next, the service concierge 203 receives service request from the user agent 2202 (S21). The service concierge 203 records, into the user database 502, information regarding the user agent 2202 and information regarding service details. For example, the service concierge 203 receives, as a request, "control for automatically operating an air-conditioner", from the user agent 2202 whose IP address is 192.168.10.128.

Next, the service provision unit 501 issues an inquiry from the inquiry transmission unit 503 to the user agent 2202 in order to obtain a timing condition for providing service (S22). For example, an inquiry such as "along what kind of operations performed by other devices, should the power of the air conditioner be turned on?" is issued.

In response to the above mentioned inquiry, in the user agent 2202, the pattern monitor unit 406 refers to the pattern database 405 and the operation history database 402 regarding the details of the received inquiry, and the response is returned to the service concierge 203 (S23). For example, in response to the above mentioned example, referring to the pattern database, a response such as "the power of the air conditioner is turned on along the operation of turning on the power of TV" is returned.

Since the information is obtained regarding the condition for turning on the power of the air conditioner in the step S23, the service concierge 203 issues a request to the user agent 2202, the request requesting to notify if an operation pattern fulfills the condition for turning on the power of the air conditioner (S24). For example, in the case where the condition is obtained in the step S23, a request such as "notify if the operation of turning on the power of TV is detected" is issued.

The user agent 2202 receives the issued request. And, the pattern monitor unit 406 monitors the operation histories accumulated in the operation history database 402, and monitors whether or not a history is newly registered, the history corresponding to the condition requested in the step S24 (S25). Here, in the case where the corresponding history is detected, the user agent 2202 notifies the condition completion to the service concierge 203 (S26). For example, after receiving a request such as "notify if an operation of turning on the power of TV is detected", the pattern monitor unit 406 monitors whether or not a TV power operation enters the operation history database 402. Here, in the case where the TV power operation is detected, the condition completion is notified to the service concierge 203.

Then, the service provision unit 501 of the service concierge 203 provides service to the user agent 2202 (S27). For example, a command for "controlling an air conditioner" is returned to the user agent 2202 whose IP address is 192.168.10.128.

Finally, after receiving the command, the user agent 2202 issues a control signal for the power operation of the air conditioner in order to provide the transmitted service (S28).

As described above, when service is required, the service concierge 203 enables the user agent 2202 to provide the optimum service.

Figure 28:
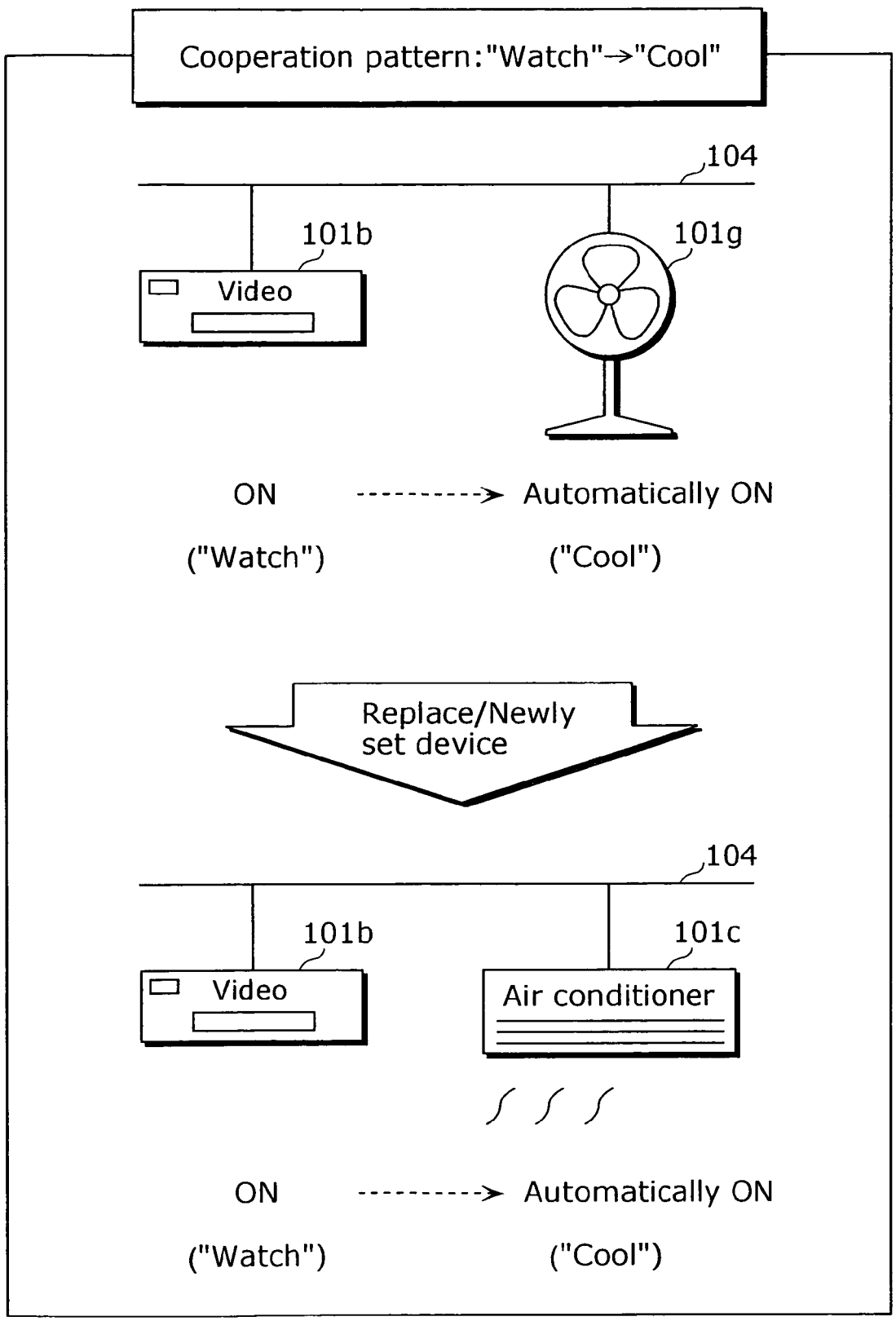
FIG. 28 is a diagram showing a concrete operational example (Part II) in an operation history utilization system according to the second embodiment.

FIG. 28 is a diagram showing a concrete operational example (Part II) of the operation history utilization system according to the present embodiment. Here, as a cooperation pattern of function sequences, an example of "Watch-Cool" is shown. In other words, the following two examples are shown: the first example of automatic control in which when a video 101*b* is played in a bedroom where there is only a fan 101*g*, the fan 101*g* automatically operates; and the second example of automatic control in which after the first example, one day when an air conditioner 101*c* is newly set replacing the fan 101*g*, if the video 101*b* is played, the air conditioner 101*c* automatically starts operating, the air conditioner not having collected the past operation histories.

Figure 29:
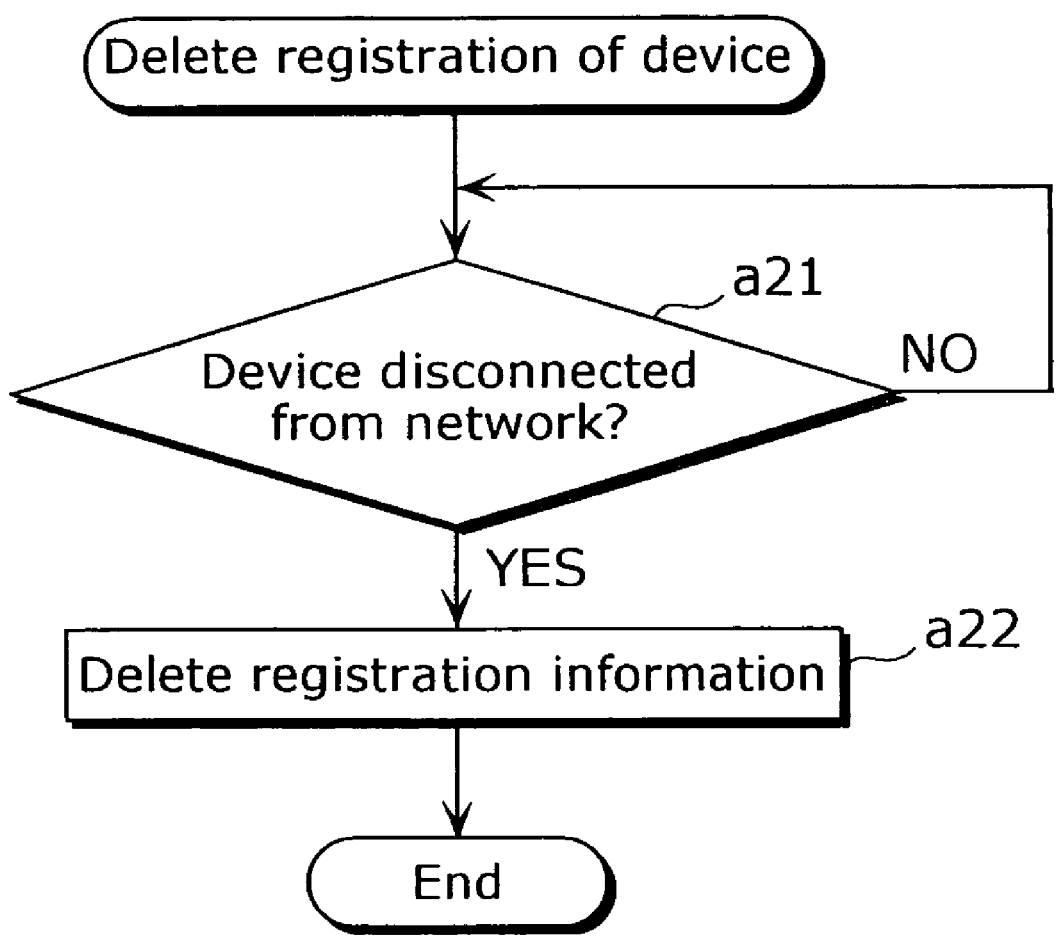
FIG. 29 is a flow chart showing processing procedures of "deleting registration of a terminal electric device" as in the operational example of the operation history system as shown in FIG. 28.

FIG. 29 is a flow chart showing processing procedures of "deleting registration of a terminal electric device" as in the operational example of the operation history system as shown in FIG. 28. Here, in the case where the terminal electric device 101 is disconnected from the LAN 104 (step a21), the user agent 2202 detects the disconnection, and deletes information regarding the terminal electric device from the management unit (not shown in the drawing) related to the connected device information in the operation history database 402 (step a22). Thereby, the registration information regarding the connected device is deleted when the device is disconnected.

Figure 30:
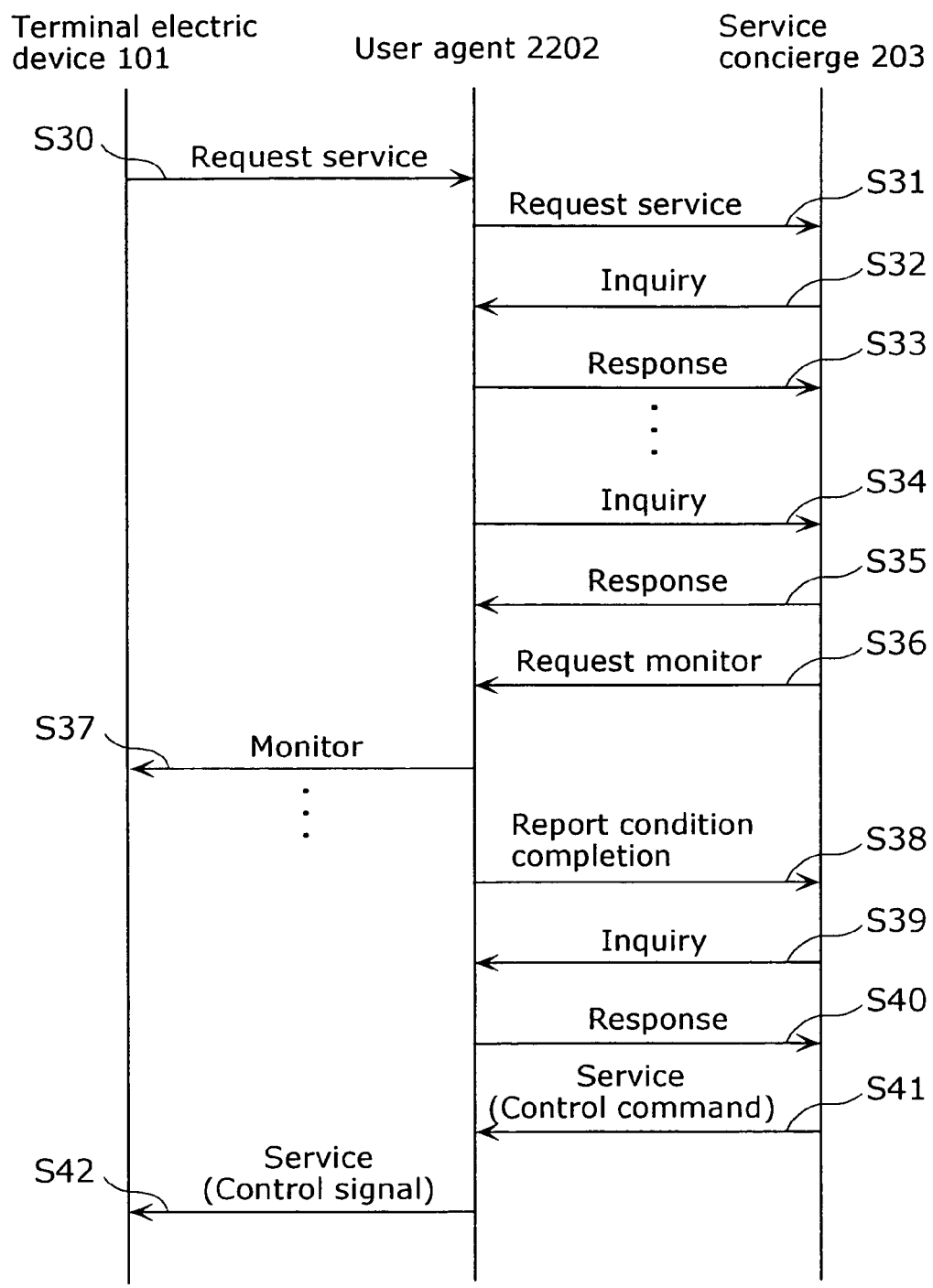
FIG. 30 is a communication sequence diagram showing procedures of a method for providing service (real-time provision method) used as in the operational example of the operation history system as shown in FIG. 28.

FIG. 30 is a communication sequence diagram showing procedures of a method (here, a real-time provision method) for providing service as in the operational example performed in the operation history system as shown in FIG. 28.

First, the terminal electric device 101 requests new service provision (S30). The user agent 2202 once receives this request. Then, the user agent 2202 notifies the service concierge 203 of information regarding the user agent 2202 and the requested service details. For example, a service such as "control for automatically cooling a room" is requested from an information control panel and the like in home.

Next, the service concierge 203 receives a service request from the user agent 2202 (S31). The service concierge 203 records, into the user database 502, information regarding the user agent 2202 and information regarding service details. For example, the service concierge 203 receives, as a request, "control for automatically cooling a room" from the user agent 2202 whose IP address is 192.168.10.128.

Next, the service provision unit 501 issues an inquiry from the inquiry transmission unit 503 to the user agent 2202 in order to obtain a timing condition for providing service (S32). For example, inquiries are issued such as "what kind of devices exist for cooling the room" and "along what kind of operations performed by other devices, should these devices for cooling the room operate?".

In response to the above mentioned inquiries, in the user agent 2202, the pattern monitor unit 406 refers to the pattern database 405 and the operation history database 402, and returns a response to the service concierge 203 (S33). For example, referring to the pattern database, a response such as "the room is cooled along the power operations of content viewing devices" is returned in response to the example of S32.

Hereinafter, the above mentioned inquiry and response are repeated according to need (S34 and S35). For example, "what kind of devices exist as the content viewing devices?" is inquired. In response, "there are TV and video" is returned as a response.

Since information regarding the condition for cooling the room is obtained in the step S35, the service concierge 203 issues a request to the user agent 2202, the request requesting to notify if the operation pattern fulfills the condition for cooling the room (S36). For example, in the step S35, in the case where the condition is obtained, the service concierge 203 issues a request such as "notify if an operation of turning on the power of TV or video is detected".

The user agent 2202 receives the issued request. Then, the pattern monitor unit 406 monitors the operation histories accumulated in the operation history database 402, and monitors whether or not a history corresponding to the condition requested in the step S36 is newly registered (S37). Here, in the case where the corresponding history is detected, the user agent notifies the service concierge 203 of the condition completion (S38). For example, after receiving a request such as "notify if an operation of turning on the power of TV or video is detected", the pattern monitor unit 406 monitors whether or not the power operations of these devices enter the operation history database 402. In the case where the corresponding power operation is detected, the user agent 2202 notifies the service concierge 203 of the condition completion.

Next, the service concierge 203 more concretely inquires the service agent 2202 about information required for identifying to which device existing in which room a control command should be issued (S39), and obtains the information (S40). For example, in the case where a TV power operation is received in the step S38, inquiries are made such as "in which room the TV exists" and "what kind of devices for cooling exist in the room". In response, information such as "an air conditioner exists in the living room" is obtained.

Then, the service provision unit 501 of the service concierge 203 provides service to the user agent 2202 (S41). For example, a command for "controlling the air conditioner of the living room" is returned to the user agent 2202 whose IP address is 192.168.10.128.

Finally, after receiving the command, the user agent 2202 issues a control signal for the power operation of the air conditioner in order to provide the transmitted service (S42).

As described above, when service is required, the service concierge 203 enables the user agent 2202 to provide the optimum service.

Third Embodiment

According to the third embodiment, in addition to extracting the user's operation sequence patterns, in operations related to viewing and browsing content, operation sequence patterns are extracted taking the content into account.

According to the present embodiment, there are two types of device agents. One is the same as the device agent 201 according to the first embodiment as shown in FIG. 4, and the other is a device agent 3201 as shown in FIG. 31.

Figure 31:
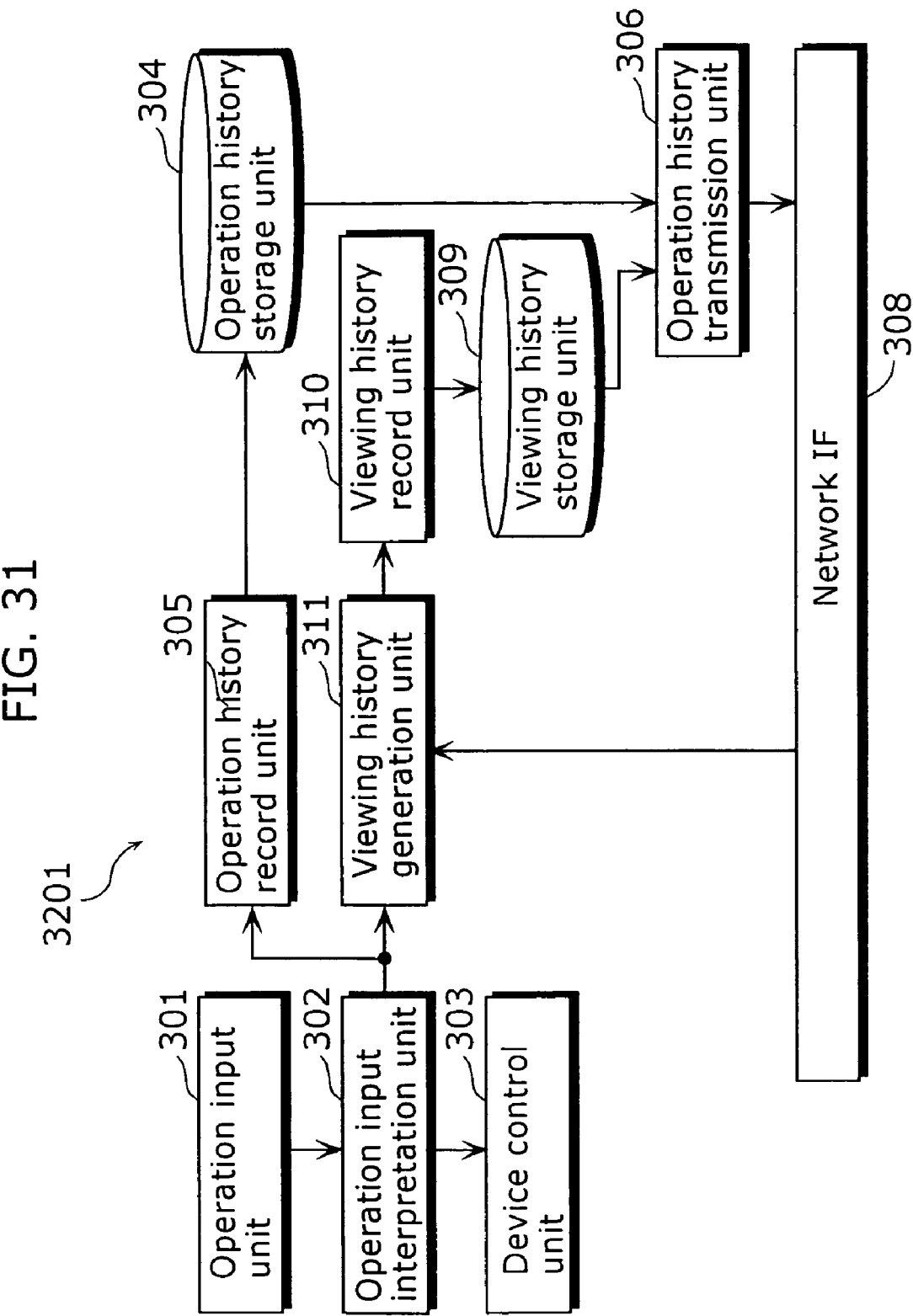
FIG. 31 is a block diagram showing a configuration of a device agent according to the third embodiment of the present invention.

In addition to the configuration of the device agent 201 according to the first embodiment as shown in FIG. 4, the device agent 3201 as shown in FIG. 31 includes: a viewing history storage unit 309; a viewing history record unit 310; and a viewing history generation unit 311. The already described components in the device agent 3201 as shown in FIG. 31 are assigned with the same codes as in FIG. 4, and the description will be omitted.

The viewing history generation unit 311 is a processing unit which obtains information regarding content the user has viewed from the network IF 308, and generates viewing history information. The viewing history storage unit 309 stores viewing history. And, the viewing history record unit 310 records the viewing history information generated in the viewing history generation unit 311 into the viewing history storage unit 309.

The device agent 3201 having the block configuration as shown in FIG. 31 is included in a terminal electric device 101 for viewing and browsing content data (TV program, video content, music content and document), such as a TV, a radio, a Compact Disc (CD) player, an MD player, a video and a Digital Versatile Disc (DVD) player. And, the device agents included in terminal electric devices 101 other than the above mentioned terminal electric devices have the block configuration of the device agent 201 as shown in FIG. 4.

Figure 32:
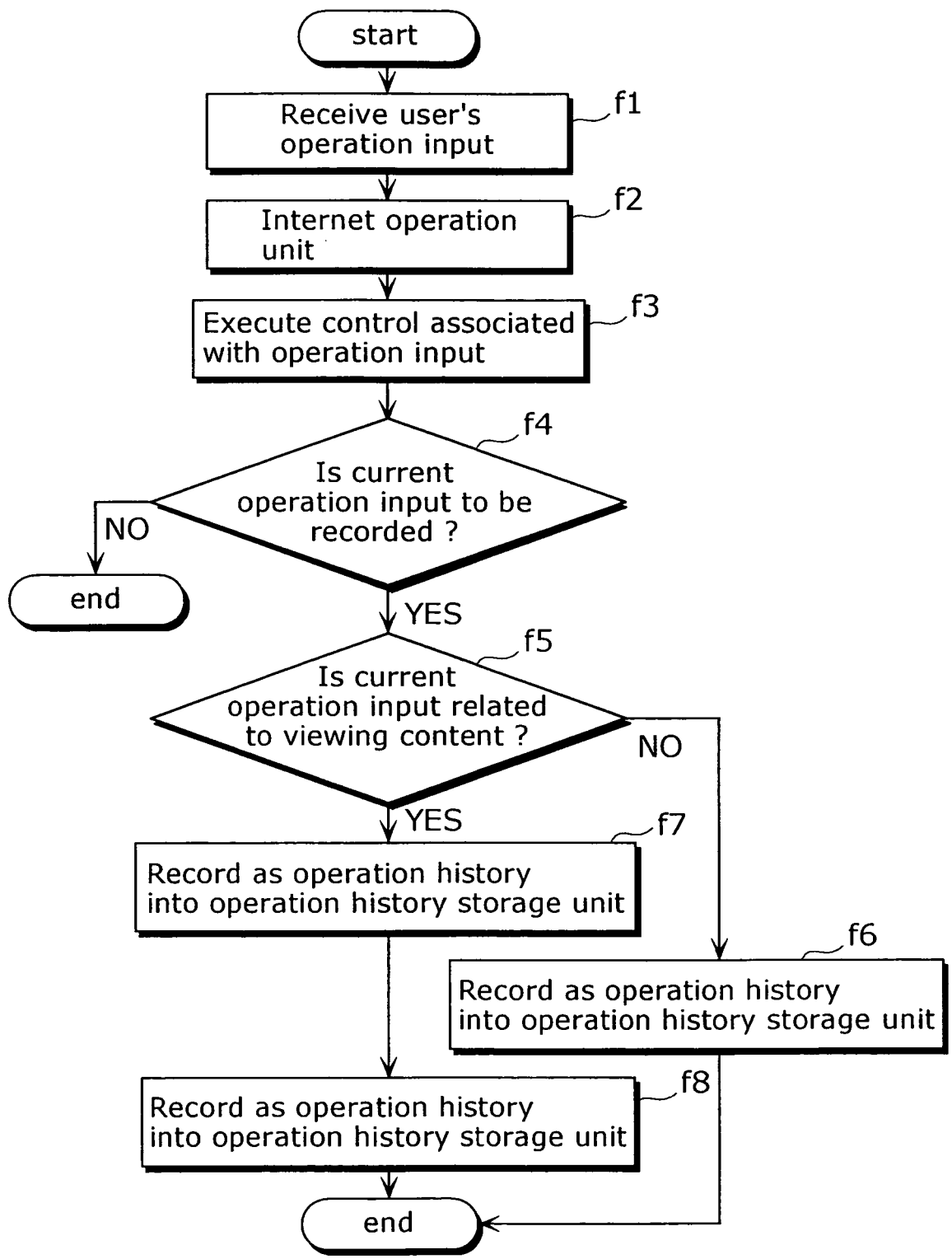
FIG. 32 is a flow chart showing a processing of storing the operation history and the content viewing history performed by the device agent as shown in FIG. 31.

Next, the operation of storing the operation history and viewing history performed by the device agent 3201 as shown in FIG. 31 will be described using a flow chart as shown in FIG. 32.

Steps f1 to f3 are the same as the steps a1 to a3 as described in FIG. 5, thus the description is omitted.

In step f4, it is examined whether or not the current operation input is to be recorded. As a result of the interpretation by the operation input interpretation unit 302, in the case where the operation input should be stored as a history, the processing is proceeded to step f5. Otherwise, the processing is ended.

In step f5, it is examined whether or not the current operation input is related to viewing content. In the case where the current input operation is related to viewing content, the processing is proceeded to step f7. Otherwise, the processing is proceeded to step f6. The operation related to viewing content means the cases of "Play" as shown in FIG. 6.

In step f6, operation date and time, device type and operation type identifier, and the argument if required are recorded as a set into the operation history storage unit 304.

In step f7, current date and time, device type and operation type identifier, and further, as argument, an internal ID assigned to the viewed content are recorded as a set into the operation history storage unit 304. In the processing up to here, the operation history is stored into the operation history storage unit 304. The stored operation history is the same as shown in FIG. 7.

In step f8, in the case of the operation related to viewing content, viewing history data is further stored into the viewing history storage unit 309, the viewing history data including items such as content internal ID, content type, global ID, title, genre and artist/performer.

Figure 33:
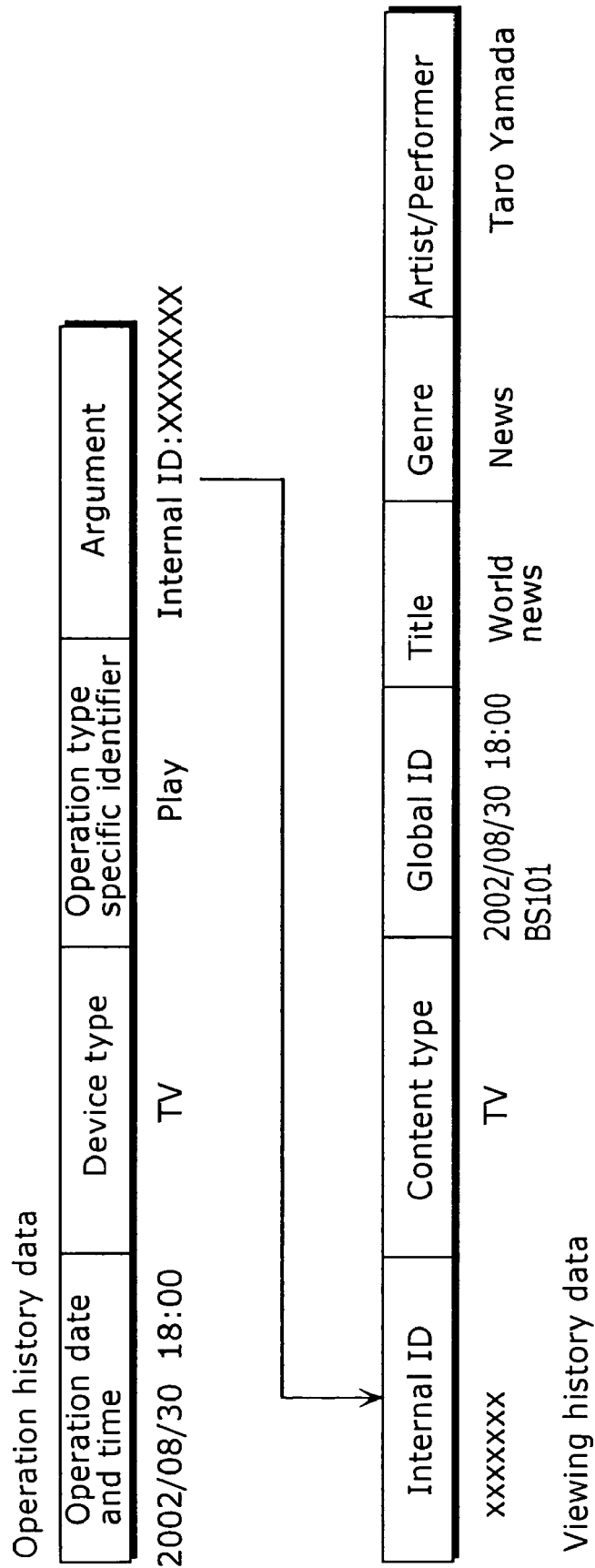
FIG. 33 is a diagram showing respective examples of operation history data and viewing history data stored in the device agent as shown in FIG. 31.

FIG. 33 shows an example of viewing operation data and a relation between operation history data and the viewing history data. In the viewing history data, the content type is determined as one of TV, radio, CD and the like depending on the operated terminal device. The global ID is information for specifying viewed content. For example, a TV program can be uniquely specified by date and time, channel, and area information if required. And, a CD can be specified by ID assigned to the disc such as Table Of Contents (TOC) information. Furthermore, the items of title, genre and artist/performer can be specified by referring to an external database via the network IF 308 based on the global ID. As such external database, for example, there is an Electronic Program Guide (EPG) for TV programs, and there is a CD Data-Base (CDDB) for CDs. Here, the external database may be accessed not via the network IF 308, but by using information transmitted in superposition with broadcast wave.

After being stored in the operation history storage unit 304 and the viewing history storage unit 309 included in the device agent 3201 as described above, the history information is transmitted to the later described user agent 3202 using the same procedures as in the steps a6 to a11 as described in FIG. 8.

Figure 34:
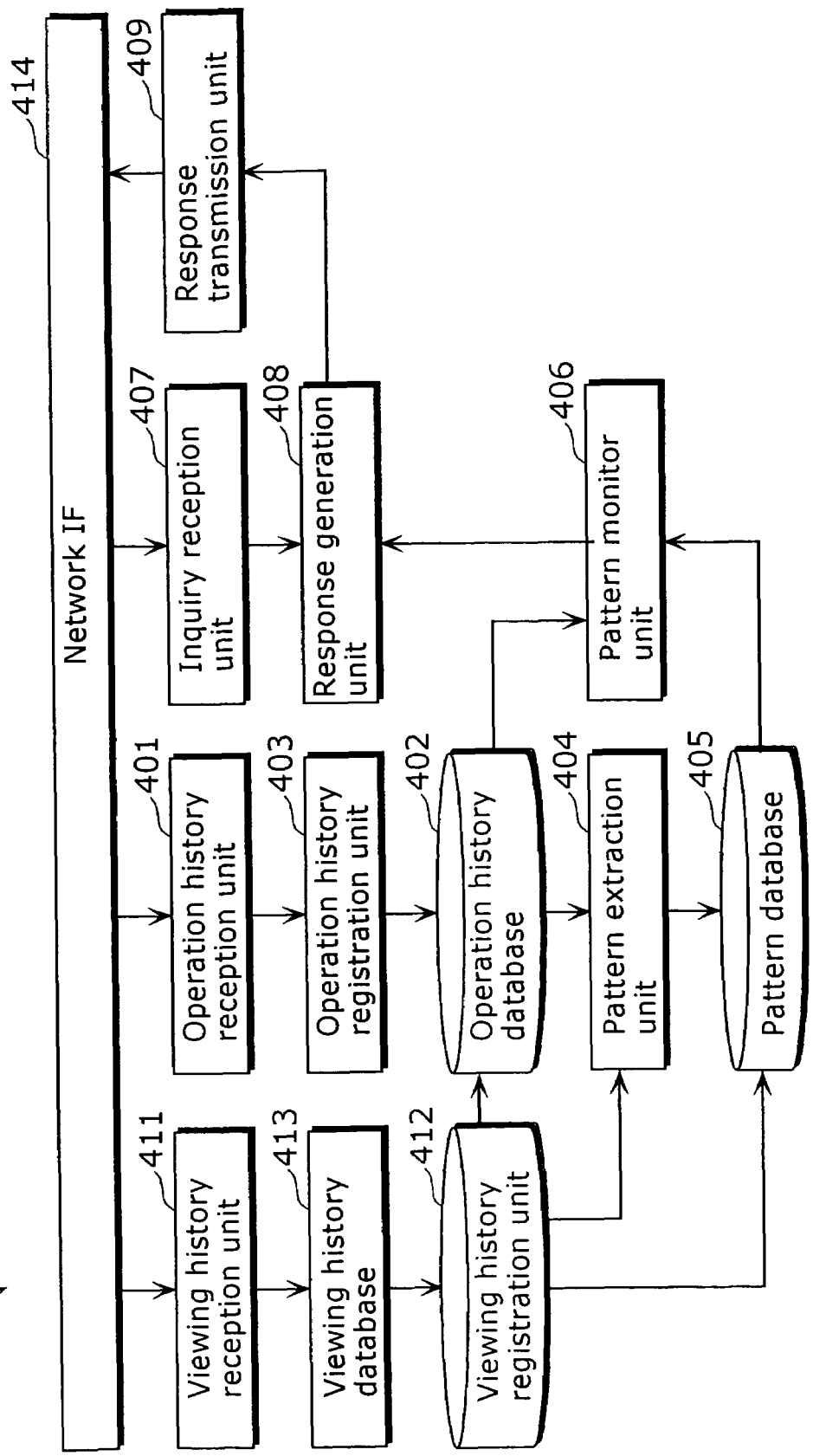
FIG. 34 is a block diagram showing a configuration of a user agent according to the third embodiment of the present invention.

Next, a block configuration of the user agent 3202 according to the present embodiment will be described. FIG. 34 is a diagram showing the block configuration of the user agent 3202 according to the present embodiment. In addition to the configuration of the user agent 202 according to the first embodiment as shown in FIG. 9, the user agent 3202 includes: a viewing history reception unit 411; a viewing history database 412; and a viewing history registration unit 413. The already described components as shown in FIG. 34 are assigned with the same codes, and concrete descriptions will be omitted.

The viewing history reception unit 411 is a processing unit which receives the viewing history transmitted from the device agent 201. The viewing history database 412 is a database which stores viewing history data. And, the viewing history registration unit 413 is a processing unit which registers the viewing history data received in the viewing history reception unit 411 into the viewing history database 412. Here, the operation history reception unit 401 and the viewing history reception unit 411 may have the same components.

The procedures of receiving the history information are essentially the same as the steps b1 to b4 as already described in FIG. 10, the procedures being performed by the user agent 3202 configured as described above. However, according to the present embodiment, there are two types of the history information received in the step b1 such as the operation history and the viewing history. Also, there are the same two types of the data to be registered in step b2.

For example, the operation history data as shown in FIG. 35 is registered into the operation history database 402 included in the user agent 3202. And, the viewing history data as shown in FIG. 36 is registered in the viewing history database 412.

Next, a method for extracting frequent operation patterns using these two history databases 402 and 412 is described using the flow chart as shown in FIG. 37.

Steps g1 to g5 are the same as the operations performed in steps c1 to c5 according to the first embodiment as shown in FIG. 12. In other words, first, episodes are generated using time condition. FIG. 38 shows episodes generated based on the viewing history data as shown in FIG. 36. Next, the same episodes or partially corresponding episodes are extracted, and registered into the pattern database 405. Among the operation sequences of the episodes as shown in FIG. 38, aside from the operation order, the following episodes completely correspond with each other: episodes 3001 and 3003; and episodes 3002 and 3004. And, the episodes 3001, 3002, 3003 and 3004 partially correspond with each other. Therefore, these completely corresponding details and partially corresponding details are registered as frequent operation patterns into the pattern database 405. In the case of the example as shown in FIG. 38, the frequent operation patterns are as shown in FIG. 39.

In step g6 as shown in FIG. 37, among the operation sequences, regarding an operation related to viewing content, that is, the operation related to "Play", genre is referred to among the viewing details stored in the operation history database 412. And, the operation type specific identifier "Play" stored in the operation history database 402 is replaced with the details of the genre. Then, episodes are generated using the same procedures as in the step g3. FIG. 40 shows the episodes generated as described above. Candidates to be registered as frequent operation sequence patterns into the pattern database 405 are extracted from among these episodes, and the processing is proceeded to step g7.

In step g7, it is examined whether or not the frequent operation patterns extracted in the step g6 are already registered in the pattern database 405. In the case where the extracted frequent operation patterns are not registered yet, the processing is proceeded to step g8. In the case where the extracted frequent operation patterns are already registered, the processing is ended.

In step g8, the frequent patterns extracted in the pattern extraction unit 404 are registered into the pattern database 405.

The operation patterns extracted by the above mentioned procedures are as shown in FIG. 39, according to the first embodiment. Thereby it can be found that "when watching TV, the air conditioner should be on". However, since there are both cases of turning the room light on and off, when the service concierge 203 predicts behavior patterns, there are no other ways than probabilistically predicting, based on the appearance frequency of the frequent operation patterns, whether or not the light is to be turned on or off. On the other hand, in the case where the content viewing history is also used, since the operation patterns are as shown in FIG. 41, it can be found that "when watching a movie on TV, the air conditioner should be on and the light should be off". Therefore, it is possible to predict behavior, regarding the content viewing operation, taking the viewed content into account.

The user agent 3202 returns the prediction result to the service concierge 203. Thereby, the service concierge 203 can predict the user's behavior, and can provide a service accurately according to the prediction.

Fourth Embodiment

According to the fourth embodiment, in addition to extracting the user's operation sequence patterns, the operation sequence patterns are extracted taking the attendants into account.

Figure 42:
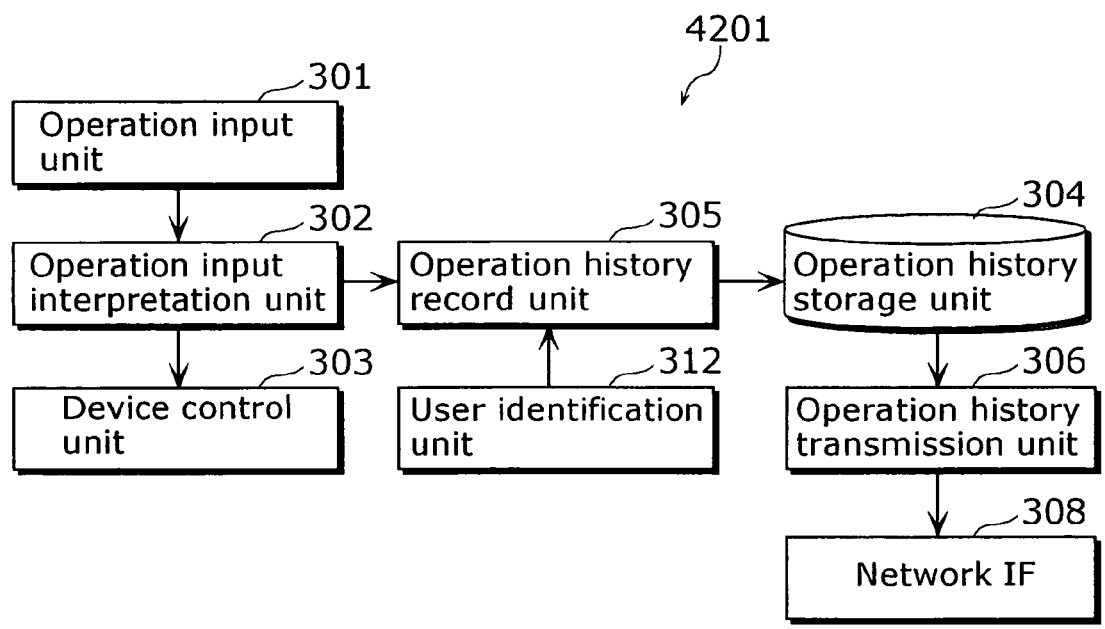
FIG. 42 is a block diagram showing a configuration of a device agent according to the fourth embodiment of the present invention.

FIG. 42 is a block diagram showing a configuration of a device agent 4201 according to the fourth embodiment. In addition to the configuration of the device agent 201 according to the first embodiment as shown in FIG. 4, the device agent 4201 includes a user identification unit 312. The already described components as shown in FIG. 42 are assigned with the same codes, and the concrete description will be omitted.

The user identification unit 312 is a processing unit which identifies who the user is, the user having performed an operation.

Another method for identifying the user by the user identification unit 312 when the user operates a device can be realized as follows: for example, the user owns a remote control assigned with a unique user ID, always operates the device using the remote control, and transmits the user ID along with the operation command inputted from the operation input unit 301. In addition, the user may always hold an authentication device such as a contactless IC (Integrated Circuit) card or an ID tag which uses Radio Frequency (RF) bandwidth. And, the device agent 4201 may examine these devices, thereby can identify the user.

According to the configuration to which the user identification unit 312 operating as described above is added, the operation history as shown in FIG. 43 can be recorded into the operation history storage unit 304 by the operation procedures as shown in FIG. 5. This operation history as shown in FIG. 43 has a configuration which includes a user ID additionally to the operation history format as described in FIG. 7.

Figure 44:
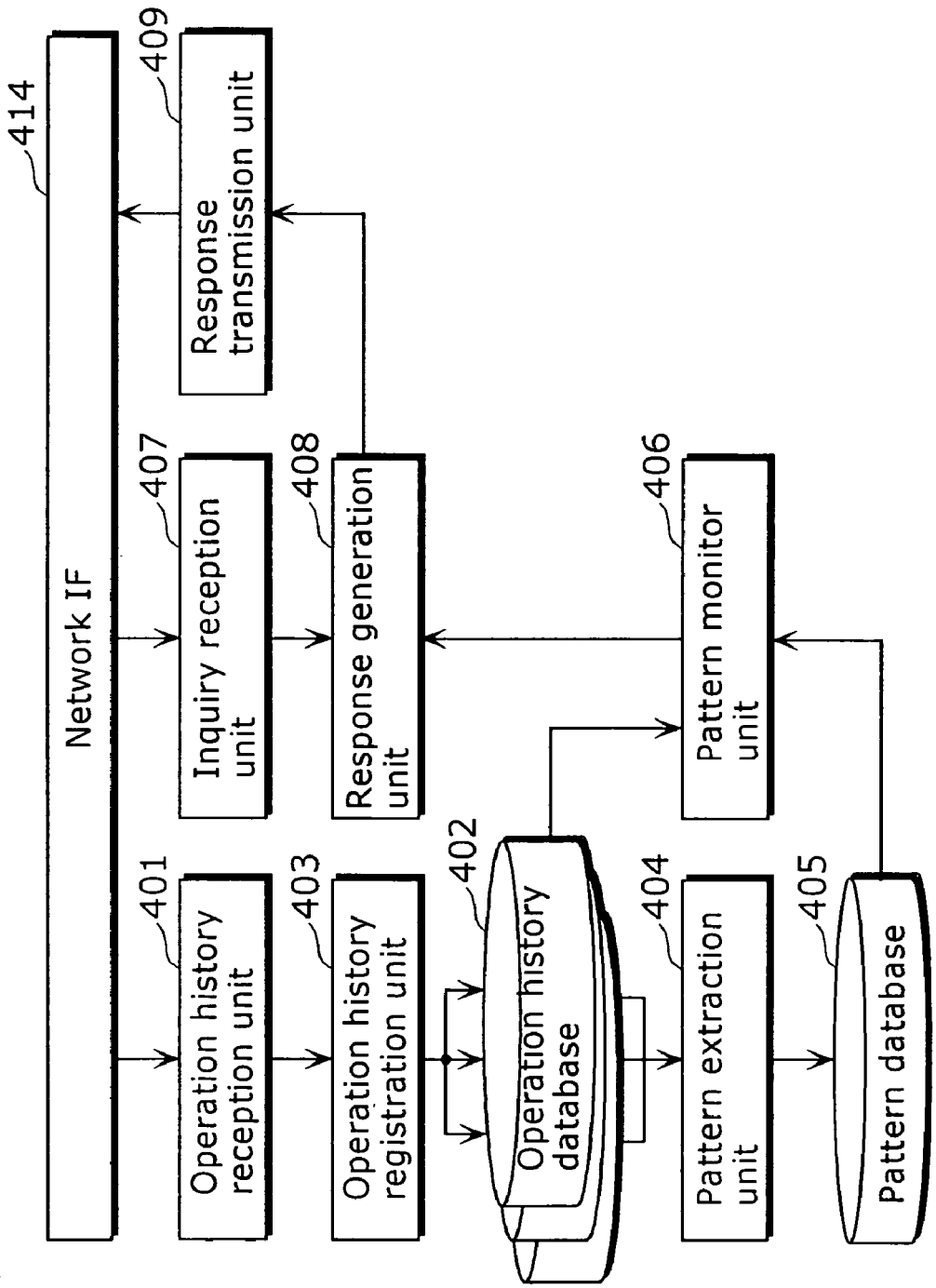
FIG. 44 is a block diagram showing a configuration of a user agent according to the fourth embodiment of the present invention.

FIG. 44 shows a block configuration of a user agent 4202 according to the present embodiment. The user agent 4202 has a configuration similar to the user agent 202 as shown in FIG. 9. However, the user agent 4202 is different from the user agent 202 in that the operation history database 402 exists as many as the number of users using the operation history database 402 in the same environment (such as in the same home), and one operation history database 402 is assigned to each user. The operation history registration unit 403 sorts and registers, into the corresponding operation history database 402, the operation history data being transmitted from the device agent 4201 according to the user ID.

Figure 8:
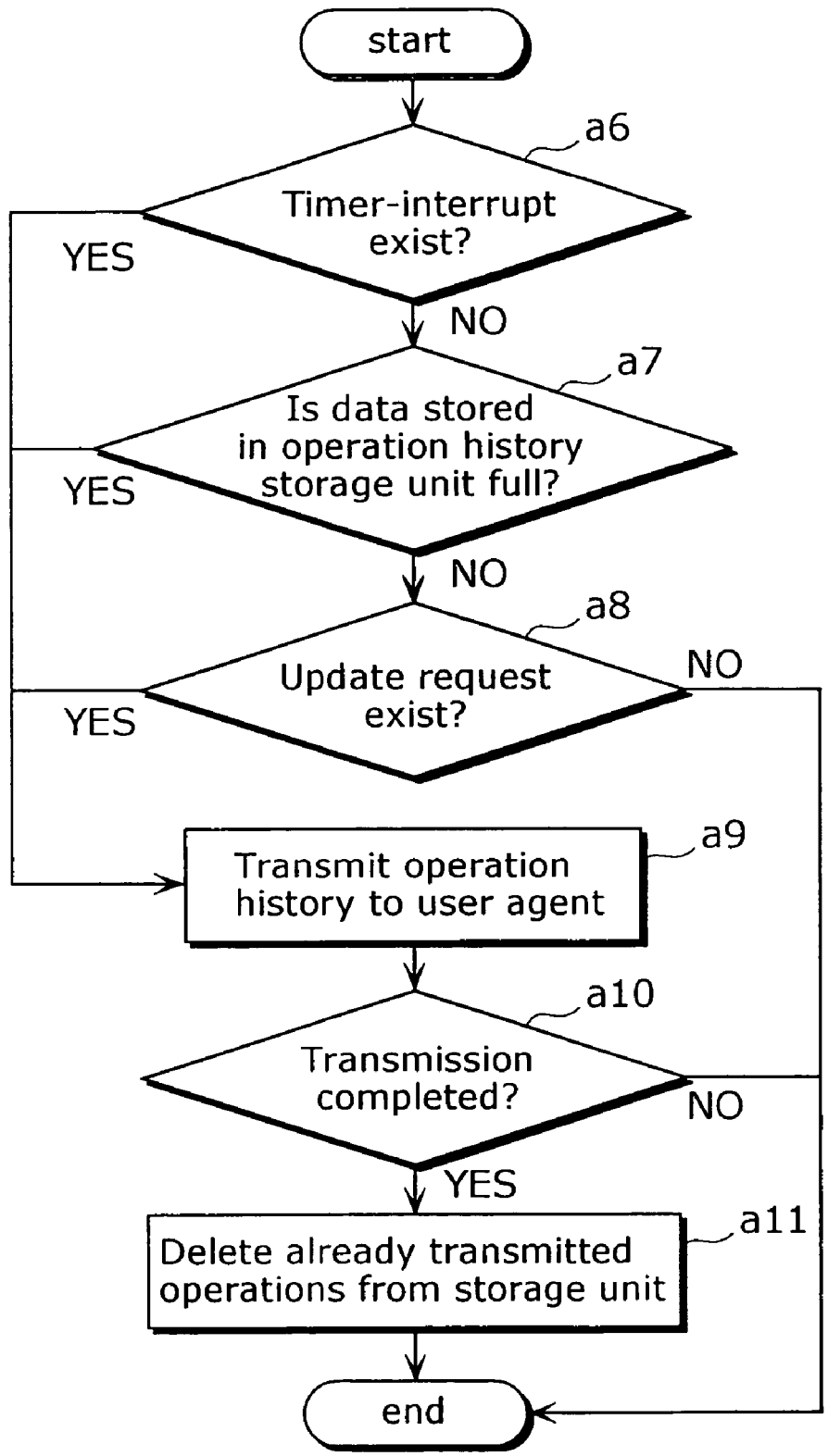
FIG. 8 is a flow chart showing a processing of transmitting an operation history performed by the device agent as shown in FIG. 4.

The procedures for (i) the transmission of the operation history data from the device agent 4201 to the user agent 4202 and (ii) data registration into the operation history database 402 are as shown in FIGS. 8 and 10. And, the operation history data is registered in the format as shown in FIG. 11 per user.

Next, the procedures of extracting frequent operation patterns in the user agent 4202 will be described referring to the flow chart as shown in FIG. 45.

In step h1, it is examined whether or not there has been an instruction to extract patterns. In the case where the inquiry reception unit 407 receives inquiry from the service concierge 203, or in the case where the pattern extraction unit 404 receives a command to update operation history pattern extraction which periodically occurs inside the user agent 4202, the processing is proceeded to step h2. In such cases as described above, specification is simultaneously received as to for which user the patterns should be extracted.

In step h2, in addition to the operation history of the specified user, the one or more operation histories of the other users under the same environment are read from the operation history database 402. The data is temporarily merged, and rearranged in chronological order. FIG. 46 shows an example of the operation history data after merging. In FIG. 46, it can be found that in the item of user ID, there are users described with the IDs such as "abc123xxx" and "def457yyy". Here, it is assumed that the users having the user IDs "abc123xxx" receive the instruction to extract the frequent operation patterns.

Going back to FIG. 45, in step h3, the pattern extraction unit 404 refers to the operation history data merged in the step h2, and classifies the merged operation history data into groups using a constant condition regarding time. In other words, in the case where the interval between the adjacent data is a predetermined time or less, the adjacent data as shown in FIG. 46 is classified as the same group. For example, in the case where the condition is set as that the interval between the adjacent data is 5 minutes or less, as shown in FIG. 46, the data can be classified into four episodes such as 4001 to 4004.

Here, referring to the sequences of the user IDs per episode, it can be found that while the episodes 4002 and 4004 are made up of the operation sequences all performed by the user "abc123xxx" alone, the episodes 4001 and 4003 include operations performed by the user "def457yyy" in addition to the operations performed by the user "abc123xxx". It is judged that the user who performed operations making up the same episode is the user who existed on the spot when the episode occurred. For example, regarding the episodes 4002 and 4004, it is judged that only the user "abc123xxx" existed. Regarding the episodes 4001 and 4003, it is judged that in addition to the user "abc123xxx", the user "def456yyy" also existed on the spot. FIG. 47 shows the summary of the above described episodes.

In step h4 as shown in FIG. 45, it is examined whether or not there are co-occurring operation sequences among episodes. In the case where there are the same or partially corresponding operation sequences among the episodes generated in step h3, the processing is proceeded to step h5. Otherwise, the processing is proceeded to step h7. For example, the frequent operation patterns as shown in FIG. 48 are extracted from among the episodes as shown in FIG. 47. Thereby, these frequent operation patterns become candidates to be registered into the pattern database 405, and the processing is proceeded to step h5.

In step h5, it is examined whether or not the frequent patterns extracted in the step h4 are already registered in the pattern database 405. In the case where the extracted frequent patterns are not registered yet, the processing is proceeded to step h6. In the case where the frequent patterns are already registered, the processing is proceeded to step h7.

In step h6, the frequent patterns extracted by the pattern extraction unit 404 are registered into the pattern database 405.

In step h7, attention is paid to the operation sequences under the condition of other user's existence. In the example as shown in FIG. 47, there are the following two cases: a case where the user "def457yyy" existed along with the user "abc123xxx" (episodes 4001 and 4003); and the case where the user "abc123xxx" existed alone (episodes 4002 and 4004). Therefore, the frequent operation patterns are extracted in each case. FIG. 49 shows the frequent operation patterns extracted as described above. Thus, these frequent operation patterns become candidates to be registered into the pattern database 405, and the processing is proceeded to step h8.

In step h8, it is examined whether or not the frequent operation patterns extracted in the step h7 are already registered in the database 405. In the case where the extracted frequent operation patterns are not registered yet, the processing is proceeded to step h9. Otherwise, the processing is ended.

In step h9, the frequent patterns extracted by the pattern extraction unit 404 are registered into the pattern database 405.

Referring to the frequent operation patterns registered in the pattern database 405 as described above, for example, in the case where the frequent operation patterns No. 1 and No. 2 as shown in FIG. 49 are compared, a formed pattern of the following action can be recognized: "when watching TV, the air conditioner should be turned on. In addition, when the user def457yyy is attendant, the light should also be turned on".

The frequent operation patterns extracted by the above mentioned procedures are as shown in FIG. 48, according to the first embodiment. Therefore, it can be found that "when watching TV, the air conditioner is turned on". However, since there are both cases of turning the room light on and off, when the service concierge 203 predicts behavior patterns, there are no other ways than probabilistically predicting, based on the appearance frequency of the frequent operation patterns, whether or not the light should be turned on or off. On the other hand, in the case of using information of the other users who existed, since the operation patterns are as shown in FIG. 49, it can be found that "when watching TV, the air conditioner should be turned on. In addition, when the user def457yyy is attendant, the light should also be turned on". Thus, it is possible to predict behavior taking the attendant user's state into account.

The user agent 4202 returns the prediction result to the service concierge 203. Thereby, the service concierge 203 can predict the user's behavior, and provide a service accurately according to the prediction.

Figure 50:
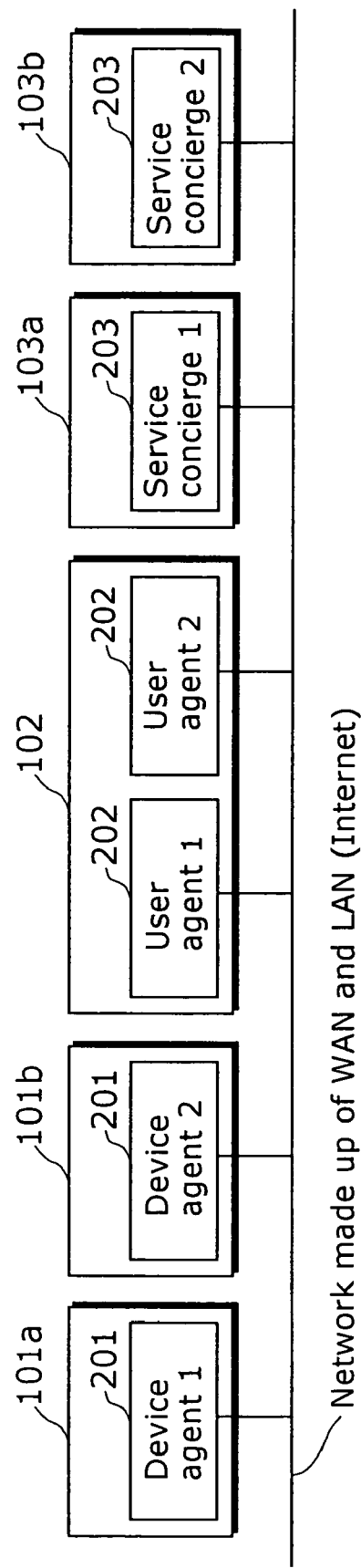
FIG. 50 is a diagram showing arrangement of main functional modules in the case where the user agent as shown in FIG. 9 is used in the fourth embodiment of the present invention.

According to the present embodiment, the user agent 4202 has a configuration which includes the operation history database 402 as many as the number of the user in order to store a plurality of users' operation history data. However, as another feasible configuration, as shown in FIG. 50, the user agents per se in the server electric device 102 may be included as many as the number of the users, and the user agents may refer to the operation history data of one another according to need. FIG. 9 shows the configuration of the user agent in such case as described above.

Fifth Embodiment

According to the fifth embodiment, in addition to extracting user's operation sequence patterns, operation sequence patterns are extracted taking the user's attendant into account, the attendant having communicated with the user by telephone, FAX and electronic mail.

According to the present embodiment, the block configurations of a device agent and a user agent are respectively the same as the device agent 201 (FIG. 4) and the user agent 202 (FIG. 9) according to the first embodiment. FIG. 51 shows operation history data registered in the operation history database 402 included in the user agent 202. Here, the operation type identifier for the operation of making a phone call is "Call", and the argument is the attendant's telephone number. The episodes are 5001 to 5004 as shown in FIG. 52. Thereby, the frequent operation patterns are as shown in FIG. 53.

Next, the frequent operation patterns are extracted taking the communication attendant into account. In FIG. 51, in the case of the operation related to communication, the device type is "Tel", the operation type identifier is "Call", and the argument is the attendant's telephone number. In such case as described above, the episodes are described as in FIG. 54. For example, the operation of making a phone call is described as "Tel-Call-0611112222" in the episode 5001.

FIG. 55 shows frequent operation patterns extracted from among the episodes as shown in FIG. 54. The frequent operation patterns as shown in FIGS. 53 and 55 will be compared as follows. In the case where the operation of "Tel-Call" is observed, it can be predicted referring to FIG. 53 that the user's next operation is either listening to music on CD or starting cooking using a microwave oven. However, there are no other ways to probabilistically predict the user's behavior further based on the appearance frequency of these frequent operation patterns. On the other hand, according to the frequent operation patterns as shown in FIG. 55, the operation patterns are clear such as "after making a phone call to 0611112222, listen to music on CD" or "after making a phone call to 0312345678, start cooking using a microwave oven". Therefore, the user agent 202 returns these prediction results as a response to the service concierge 203. Thus, the service concierge 203 can predict the user's behavior, and can provide service accurately according to the prediction.

Sixth Embodiment

According to the sixth embodiment, a user agent 6202 and a service concierge 6203 are included together in the server electric device 102 or the application server 103.

Figure 56:
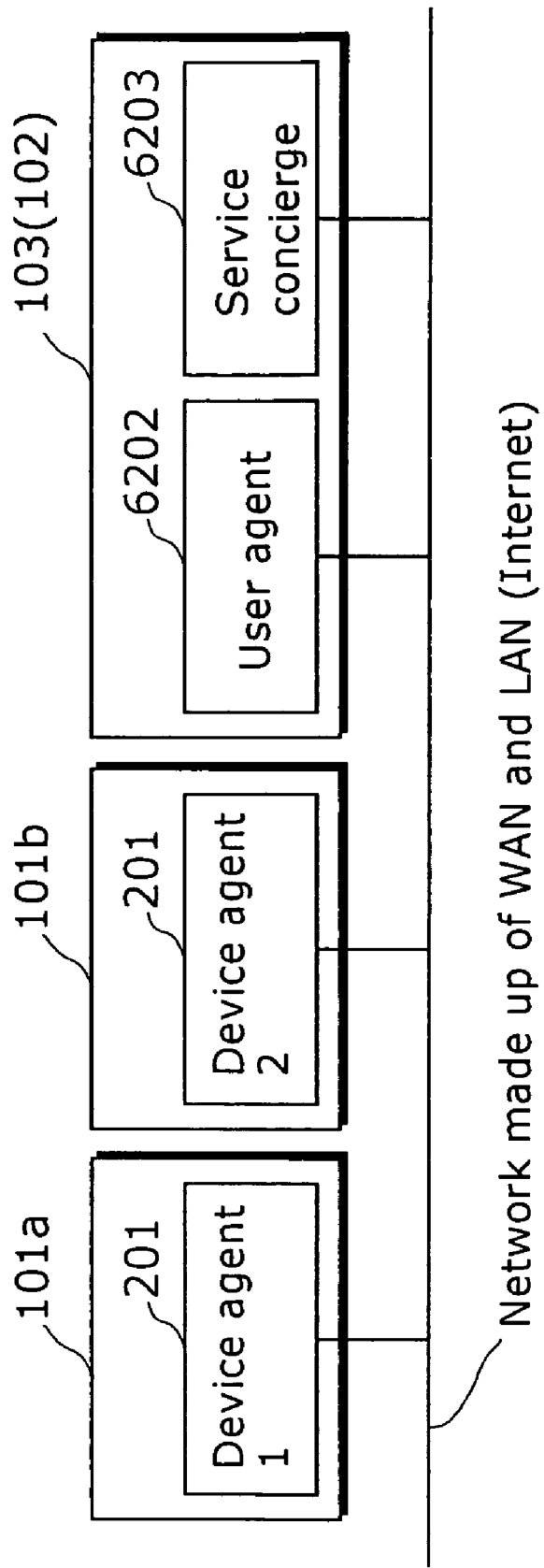
FIG. 56 is a diagram showing arrangement of main functional modules according to the sixth embodiment of the present invention.

FIG. 56 is a diagram showing arrangement of main functional modules. The arrangement of main functional modules according to the present embodiment is different from that of FIG. 2 in that the user agent 6202 and the service concierge 6203 are included together in the server electric device 102 or the application server 103. Hereinafter, the following example will be described: the application server 103 includes the user agent 6202 and the service concierge 6203.

Figure 57:
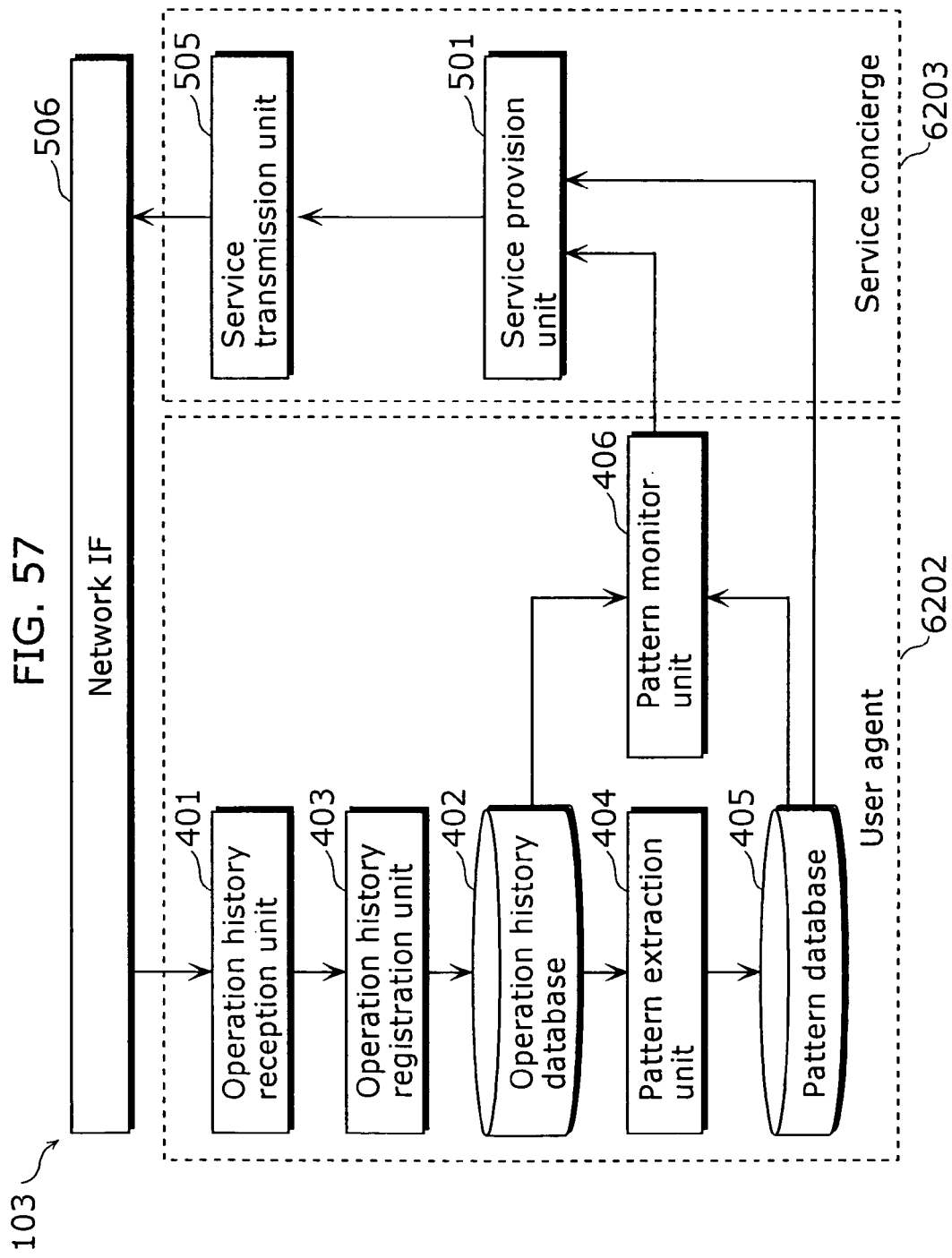
FIG. 57 is a block diagram showing a configuration of the application server as shown in FIG. 56.

FIG. 57 is a block diagram showing a configuration of the application server 103. This application server 103 is mainly made up of the user agent unit 6202 and the service concierge unit 6203. The user agent unit 6202 includes: the operation history reception unit 401; the operation history database 402; the operation history registration unit 403; the pattern extraction unit 404; the pattern database 405; and the pattern monitor unit 406. And, the service concierge unit 6203 includes the service provision unit 501 and the service transmission unit 505. Here, the same components as already described in FIGS. 9 and 16 are assigned with the same codes.

According to the first to fifth embodiments, the service concierge 203 makes an inquiry to the user agent in order to obtain information regarding the user (the user's operation history and frequent operation patterns). However, according to the above mentioned configuration of the present embodiment, the user agent unit 6202 and the service concierge unit 6203 are connected inside the application server 103. Therefore, it is possible to provide service by predicting the user's behavior without needing to exchange inquiry and response via the network IF 506 and without increasing the network traffic.

Seventh Embodiment

According to the seventh embodiment, user's frequent operation patterns are extracted not in the user agent but in the service concierge.

Figure 58:
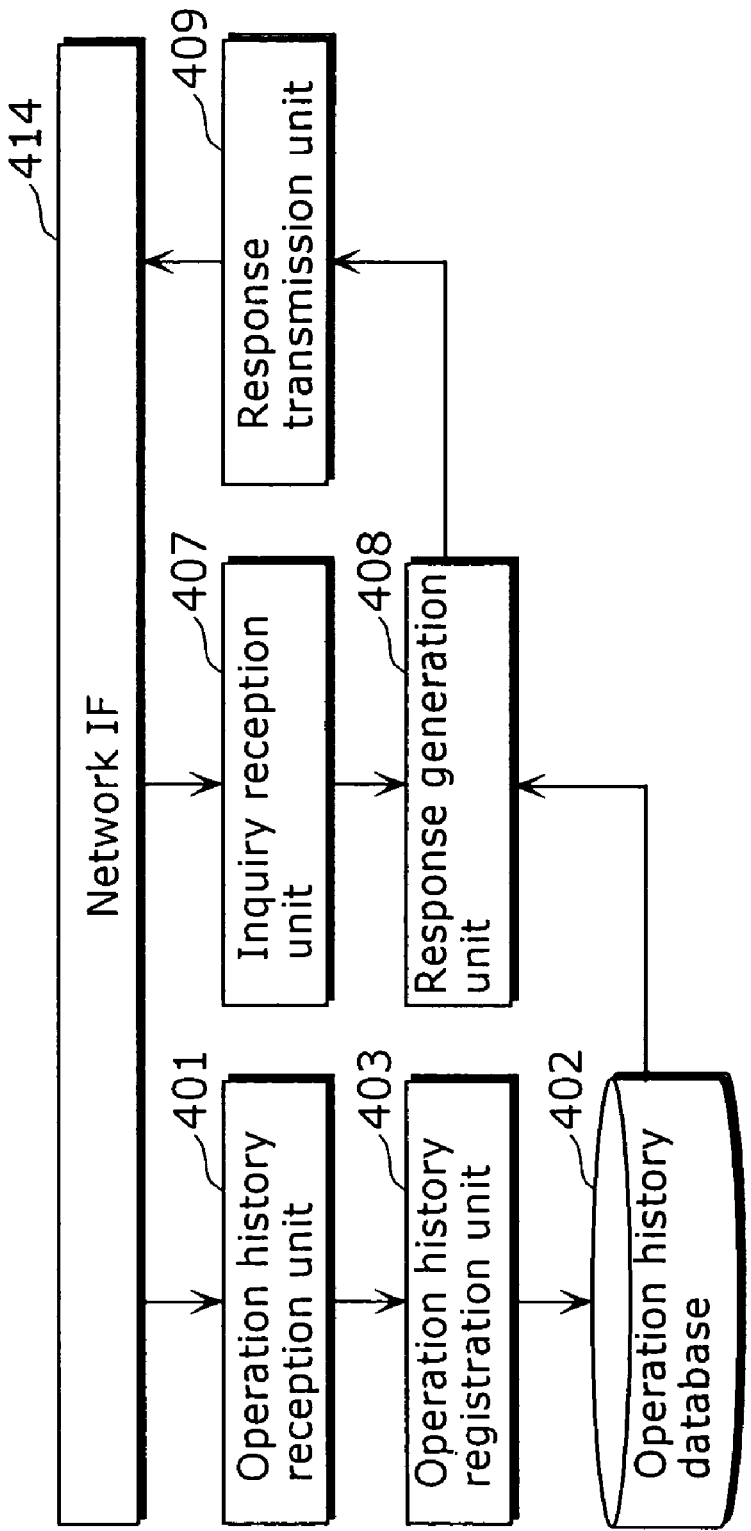
FIG. 58 is a block diagram showing a configuration of a user agent according to the seventh embodiment of the present invention.

FIG. 58 is a block diagram showing a configuration of a user agent 7202 according to the present embodiment. According to the configuration of the user agent 7202, the pattern extraction unit 404 required for extracting the user's frequent operations, the pattern database 405 and the pattern monitor unit 406 are deleted from the configuration of the user agent 202 as shown in FIG. 9.

Figure 59:
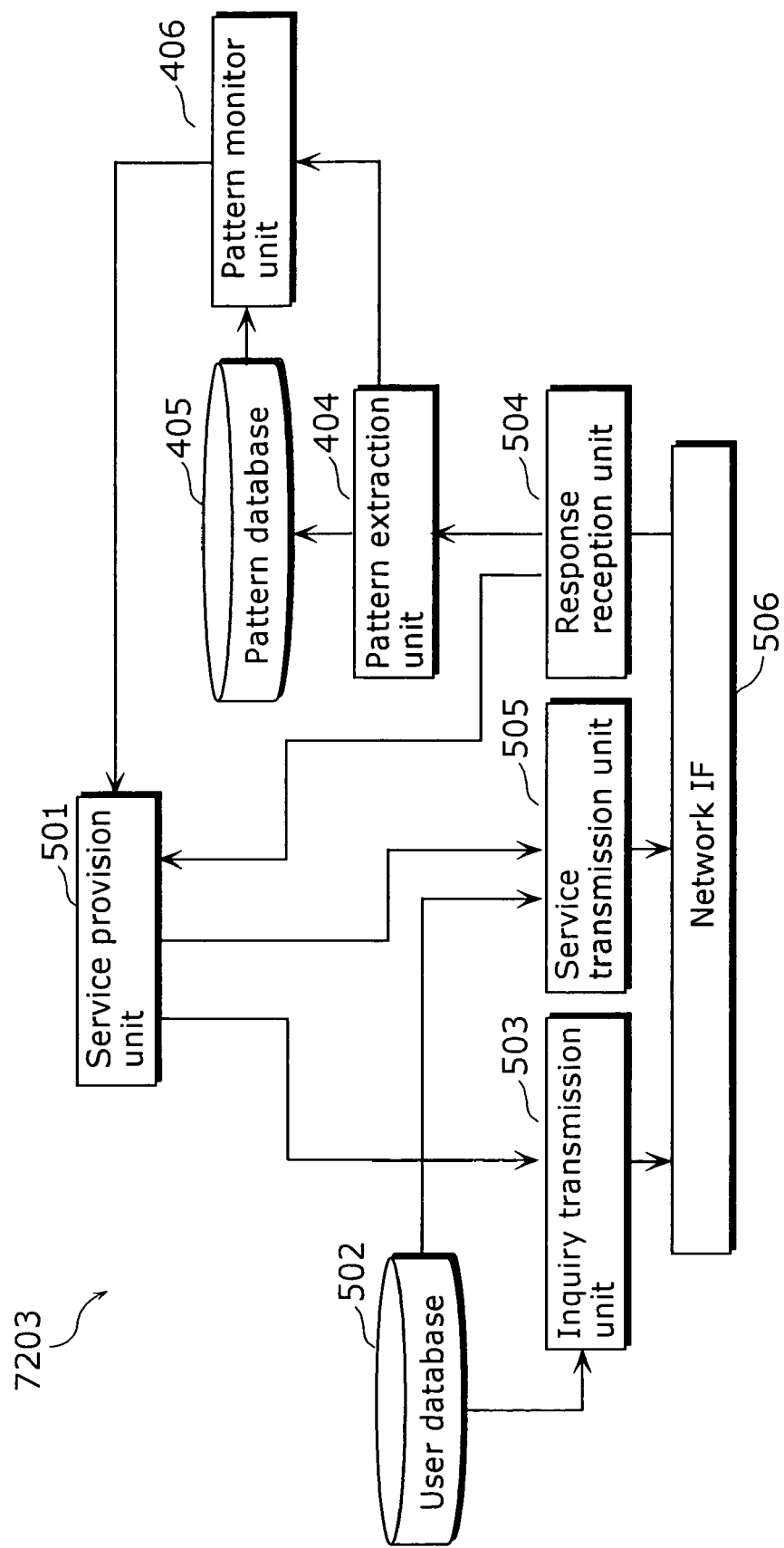
FIG. 59 is a block diagram showing a configuration of a service concierge according to the seventh embodiment of the present invention.

Next, FIG. 59 is a block diagram showing a configuration of the service concierge 7203 according to the present embodiment. In addition to the configuration of the service concierge 203 according to the first embodiment as shown in FIG. 16, the service concierge 7203 includes: the pattern extraction unit 404; the pattern database 405; and the pattern monitor unit 406. In other words, the configuration of the service concierge 7203 is equivalent to that of the service concierge 203 according to the first embodiment added with the components which are included in the user agent 202, but not included in the user agent 7202.

According to the configuration as described above, the user agent 7202 accumulates the operation history data into the operation history database 402, and returns the operation history data according to the request from the service concierge 203. On the other hand, the service concierge 7203 receives the user's operation history data transmitted from the user agent 7202 in response to its own request, extracts and detects the frequent operation patterns, and thus can provide service according to the user's operation and action patterns.

According to the form of service, the service concierge 7203 can arbitrarily select the optimum viewpoint and method of extracting the frequent operation sequences.

Therefore, the optimum method may be employed according to the details and quality of the service to be provided.

As described above, according to the present invention, in the system where the plurality of terminal devices are connected via network, the operation history and content viewing history of each individual terminal device can be collected per user or per family; such operation data can be managed in a centralized manner; context related to the user's behavior can be extracted from the data; and the extracted result can be reflected to the service to be provided such as automatic control of devices and providing information.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention can be applied to an operation history utilization system which is a communication system in which various devices, a user server and an application server are connected via a transmission path. In particular, the present invention can be applied to an operation history utilization system which is a communication system including: terminal electric devices such as a digital TV, a video, an air conditioner, a light, an MD stereo and a PC; a server electric device such as a home server and a home gateway; and an application server such as a computer.

The invention claimed is:

1. An operation history utilization system which utilizes a user's operation history on a plurality of devices, and provides the user with a service, the system comprising:
   a plurality of devices that transmit operation data that describes a user's operation details on said plurality of devices; and
   a service provision apparatus that (i) accumulates the operation data transmitted from said plurality of devices as operation history data in chronological order, (ii) specifies a frequent operation pattern which is a sequence of frequent operation history patterns based on the accumulated operation history data and (iii) provides a service according to the user's behavior predicted from the specified frequent operation pattern included in the accumulated operation history data,
   wherein said service provision apparatus includes:
   an operation history reception unit that receives the operation history data transmitted from said plurality of devices;
   an operation history database unit that accumulates the received operation history data;
   a pattern extraction unit that extracts the frequent operation pattern from the operation history data accumulated in said operation history database unit;
   a pattern database unit that stores the extracted frequent operation pattern, the frequent operation pattern including operation history data that is classified into a group and accumulated for the plurality of devices during a predetermined time interval;
   a pattern monitor unit that monitors whether or not a sequence of operation history data newly received by said operation history reception unit corresponds to the frequent operation pattern stored in said pattern database unit;
   a service provision unit that provides the service according to the user's behavior predicted from a result of the monitoring performed by said pattern monitor unit; and
   a function database unit that stores a predetermined relationship between operations performed by said plurality of devices and a function provided to the user in response to the operations,
   wherein said pattern extraction unit compares the operation history data accumulated in said operation history database unit with a predetermined relationship in said function database unit, converts the operation history data into a sequence of functions, extracts a frequent function pattern from the sequence of functions, and stores the extracted frequent function pattern into said pattern database unit,
   said service provision unit provides the service relating to said plurality of devices according to the user's behavior predicted from the result of monitoring performed by said pattern monitoring unit, and
   the function provided to the user is a main function associated with a names of said plurality of devices.

2. The operation history utilization system according to claim 1,
   wherein said service provision apparatus includes:
   a user server apparatus which (i) accumulates the operation history data, (ii) specifies the frequent operation pattern based on the accumulated operation history data and (iii) predicts the user's behavior from the specified frequent operation pattern; and
   an application server apparatus which provides service according to the user's behavior predicted by said user server apparatus.

3. The operation history utilization system according to claim 1,
   wherein said service provision apparatus includes:
   a user server apparatus which accumulates the operation history data; and
   an application server apparatus which (i) specifies the frequent operation pattern based on the operation history data accumulated in said user server apparatus, (ii) predicts the user's behavior from the specified frequent operation pattern and (iii) provides service according to the predicted user's behavior.

4. The operation history utilization system according to claim 1,
   wherein each of said plurality of devices includes:
   an operation history storage unit that stores operation history data in which a date and a time of an operation are stored in association with details regarding a performed operation performed; and
   an operation history transmission unit that transmits operation history data to said service provision apparatus at a predetermined timing, the operation history data being stored in said operation history storage unit.

5. The operation history utilization system according to claim 4,
   wherein each of said plurality of devices further includes a viewing history storage unit that stores viewing history data related to content viewed by the user, and
   said operation history transmission unit transmits, to said service provision apparatus, the viewing history data stored in said viewing history storage unit together with the operation history data.

6. The operation history utilization system according to claim 4,
   wherein each of said plurality of devices further includes a user identification unit that identifies the user who performed the operation, and said operation history storage unit stores a result identified by said user identification unit as a part of the operation history.

7. The operation history utilization system according to claim 4,
wherein each of said plurality of devices stores information as a part of an operation history into said operation history storage unit, the information describing a communication partner.

8. The operation history utilization system according to claim 1,
wherein said service provision apparatus includes:
a viewing history reception unit that receives viewing history data transmitted together with the operation history data from said plurality of devices; and
a viewing history database unit that accumulates the received viewing history data, and
said pattern extraction unit extracts a frequent pattern from both of the operation history data accumulated in said operation history database unit and the viewing history data accumulated in said viewing history database unit.

9. The operation history utilization system according to claim 1,
wherein said pattern extraction unit utilizes information regarding the user operating said plurality of devices so as to extract the frequent operation pattern, the information being transmitted from said plurality of devices.

10. The operation history utilization system according to claim 1,
wherein said pattern extraction unit utilizes information regarding a communication partner so as to extract the frequent operation pattern, the information being transmitted from said plurality of devices.

11. The operation history utilization system according to claim 1, wherein said plurality of devices transmits respective operation data describing the details of the user's operation, and
said service provision apparatus (i) accumulates operation data transmitted from the plurality of devices as operation history data in chronological order, (ii) specifies a frequent operation pattern based on the accumulated operation history data and (iii) provides a service according to the user's behavior predicted from the specified frequent operation pattern.

12. The operation history utilization system according to claim 1,
wherein said serviced provision apparatus provides the service by automatically controlling said plurality of devices according to the frequent operation pattern.

13. An operation history utilization method for utilizing a user's operation history and providing the user with service, the method comprising steps of:
transmitting operation data that describes details regarding the user's operation details on a plurality of devices, said transmitting being performed by the plurality of devices;
accumulating the operation data transmitted from the plurality of devices as operation history data in chronological order;
specifying a frequent operation pattern which is a sequence of frequent operation history patterns based on the accumulated operation history data; and
providing service according to the user's behavior predicted from the specified frequent operation pattern included in the accumulated operation history data;
receiving operation history data transmitted from the plurality of devices;
accumulating the operation history data received from the plurality of devices in an operation history database unit;
extracting the frequent operation pattern from the operation history data accumulated in the operation history database unit using a pattern extracting unit;
storing the extracted frequent operation pattern in a pattern database unit, the frequent operation pattern including operation history data that is classified into a group and accumulated from the plurality of devices during a predetermined time interval;
monitoring whether or not a sequence of newly received operation history data from said plurality of devices corresponds with the frequent operation stored in said pattern database unit;
providing the service according to the user's behavior predicted from a result of the performed monitoring; and
storing in a function database unit a predetermined relationship between operations performed by the plurality of devices and a function provided to the user in response to the operations,
wherein the pattern extraction unit compares the operation history data accumulated in the operation history database unit with a predetermined relationship in the function database unit, converts the operation history data into a sequence of functions, extracts a frequent function pattern from the sequence of functions, and stores the extracted frequent function pattern into said pattern database unit,
providing the service relating to said plurality of devices according to the user's behavior predicted from the result of monitoring performed and
the function provided to the user is a main function associated with names of said plurality of devices.

14. The operation history utilization method according to claim 13, the method comprising:
storing operation history data in which a date and a time of an operation in association with details of a type of operation; and
transmitting the stored operation history data from said plurality of devices at a predetermined timing.

15. A service provision apparatus which provides a user with service by utilizing the user operation history on a plurality of devices, the apparatus comprising:
at least one hardware processor and a memory device, the memory device storing a program that causes the service provision apparatus to operate as:
a reception unit that receives operation data describing the user's operation details transmitted from the plurality of devices; and
a service provision unit that accumulates the received operation data as operation history data in chronological order, to specify a frequent operation pattern which is a sequence of frequent operation patterns based on the accumulated operation history data, and to provide service according to the user's behavior predicted from the specified frequent operation pattern,
wherein the program also causes said service provision apparatus to operate
an operation history reception unit that receives the operation history data transmitted from said plurality of devices;
an operation history database unit that accumulates the received operation history data;
a pattern extraction unit that extracts the frequent operation pattern from the operation history data accumulated in said operation history database unit;

a pattern database unit that stores the extracted frequent operation pattern, the frequent operation pattern including operation history data that is classified into a group and accumulated for the plurality of devices during a predetermined time interval;

a pattern monitor unit that monitors whether or not a sequence of operation history data newly received by said operation history reception unit corresponds to the frequent operation pattern stored in said pattern database unit;

a service provision unit that provides the service according to the user's behavior predicted from a result of the monitoring performed by said pattern monitor unit; and a function database unit that stores a predetermined relationship between operations performed by said plurality of devices and a function provided to the user in response to the operations, wherein said pattern extraction unit is compares the operation history data accumulated in said operation history database unit with a predetermined relationship in said function database unit, convert the operation history data into a sequence of functions, extracts a frequent function pattern from the sequence of functions, and stores the extracted frequent function pattern into said pattern database unit, said service provision unit provides the service relating to said plurality of devices according to the user's behavior predicted from the result of monitoring performed by said pattern monitoring unit, and the function provided to the user is a main function associated with names of said plurality of devices.

16. A program stored on a computer-readable storage medium for a service provision apparatus which provides a user with service by utilizing the user's operation history on a plurality of devices, the program causing a computer to execute steps of:

receiving operation data describing the user's operation transmitted from said plurality of devices; and accumulating the received operation data as operation history data in chronological order, specifying a frequent operation pattern which is a sequence of frequent operation history data based on the accumulated operation history data, and providing service according to the user's behavior predicted from the specified frequent operation pattern;

receiving operation history data transmitted from the plurality of devices;

accumulating the operation history data received from the plurality of devices in an operation history database unit;

extracting the frequent operation pattern from the operation history data accumulated in the operation history database unit using a pattern extracting unit;

storing the extracted frequent operation pattern in a pattern database unit, the frequent operation pattern including operation history data that is classified into a group and accumulated from the plurality of devices during a predetermined time interval;

monitoring whether or not a sequence of newly received operation history data from said plurality of devices corresponds with the frequent operation stored in said pattern database unit; and providing the service according to the user's behavior predicted from a result of the performed monitoring; and storing in a function database unit a predetermined relationship between operations performed by the plurality of devices and a function provided to the user in response to the operations, wherein the pattern extraction unit compares the operation history data accumulated in the operation history database unit with a predetermined relationship in the function database unit, converts the operation history data into a sequence of functions, extracts a frequent function pattern from the sequence of functions, and stores the extracted frequent function pattern into said pattern database unit, providing the service relating to said plurality of devices according to the user's behavior predicted from the result of monitoring performed, and the function provided to the user is a main function associated with names of said plurality of devices.

17. The operation history utilization system according to claim 1, wherein the function is a generic concept of a specific one of the operations, and is an operation independent of a device type of each of said plurality of devices.

* * * * *